US005512651A

United States Patent [19]

Carlson et al.

[11] Patent Number: 5,512,651
[45] Date of Patent: Apr. 30, 1996

[54] STRONG CARBOXYLIC ACID FUNCTIONAL POLYURETHANE POLYMERS AND BLENDS THEREOF USED IN MAGNETIC RECORDING MEDIA

[75] Inventors: James G. Carlson; Jeffery T. Anderson, both of Lake Elmo; Nelson T. Rotto, North St. Paul, all of Minn.

[73] Assignee: Minnesota Mining and Manufacturing Company, Saint Paul, Minn.

[21] Appl. No.: 283,244

[22] Filed: Jul. 29, 1994

[51] Int. Cl.[6] .............................. C08G 18/28; G11B 5/70
[52] U.S. Cl. ..................... 528/73; 252/62.54; 428/323; 428/329; 428/402; 428/423.1; 428/424.6; 428/425.9; 428/515; 428/518; 428/520; 428/522; 428/689; 428/692; 428/694 R; 428/694 BC; 428/694 BG; 428/694 BU; 428/694 BL; 428/694 BN; 428/900; 427/128
[58] Field of Search .................................. 528/71, 48, 73, 528/75, 84, 85; 525/440, 454, 455; 524/568, 502; 252/62.54; 427/128; 428/323, 329, 402, 423.1, 424.6, 425.9, 515, 518, 520, 522, 689, 692, 694 R, 694 BC, 694 BG, 694 BU, 694 BL, 694 BN, 900

[56] References Cited

U.S. PATENT DOCUMENTS

| | | | |
|---|---|---|---|
| 3,419,510 | 12/1968 | Hudak . | |
| 3,460,984 | 8/1969 | Bisschops | 117/161 |
| 4,096,127 | 6/1978 | Schurmann et al. | 260/77.5 |
| 4,571,364 | 2/1986 | Kasuga et al. | 428/336 |
| 4,612,244 | 9/1986 | Kaneda et al. | 428/323 |
| 4,613,545 | 9/1986 | Chubachi et al. | 428/328 |
| 4,707,410 | 11/1987 | Hata et al. | 428/413 |
| 4,707,411 | 11/1987 | Nakayama et al. | 428/413 |
| 4,731,292 | 3/1988 | Sasaki et al. | 428/425 |
| 4,784,907 | 11/1988 | Matsufuji et al. | 428/328 |
| 4,784,914 | 11/1988 | Matsufuji et al. | 428/418 |
| 4,788,103 | 11/1988 | Okita et al. | 428/425.9 |
| 4,816,683 | 3/1989 | Marsden | 250/385.1 |
| 4,837,082 | 6/1989 | Harrell et al. | 428/329 |
| 4,983,491 | 1/1991 | Aoai et al. | 430/175 |
| 5,041,336 | 8/1991 | Ohya et al. | 428/694 BG |
| 5,071,578 | 12/1991 | Ohkubo et al. | 252/62.54 |
| 5,081,213 | 1/1992 | Carlson | 528/73 |
| 5,085,941 | 2/1992 | Ohkubo | 428/424.6 |
| 5,091,270 | 2/1992 | Ohya et al. | 428/900 |
| 5,165,999 | 11/1992 | Ushimaru et al. | 428/425.9 |
| 5,244,739 | 9/1993 | Carlson et al. | 428/425.9 |
| 5,356,726 | 10/1994 | Nishikawa et al. | 428/694 BG |

FOREIGN PATENT DOCUMENTS

| | | |
|---|---|---|
| 3-64310 | 3/1991 | Japan . |
| 3-64314 | 3/1991 | Japan . |

OTHER PUBLICATIONS

Chujo, et al. "Synthesis of Polyurethane Graft Copolymers . . .", Polymer Bulletin 8, 239–244 Dec. 1982.

Primary Examiner—James J. Seidleck
Assistant Examiner—John M. Cooney, Jr.
Attorney, Agent, or Firm—Gary L. Griswold; Walter N. Kirn; Janice L. Dowdall

[57] ABSTRACT

The invention provides novel hydroxyl functional polyurethanes which can be used in magnetic media binders applications. The polyurethanes comprise strong carboxylic acid groups pendant from the polymer backbone, which groups can be produced by esterification of backbone hydroxyl moieties with cyclic dicarboxylic acid anhydrides. Examples of anhydrides useful in preparation of the polyurethanes include anhydrides of tetrachlorophthalic acid, tetrafluorophthalic acid, and dichloromaleic acid, etc. The polyurethanes, which are optionally radiation curable, show high affinity for magnetic pigments, and blends of the polyurethanes with vinyl and non-vinyl resins afford excellent binders for magnetic recording media.

41 Claims, No Drawings

STRONG CARBOXYLIC ACID FUNCTIONAL POLYURETHANE POLYMERS AND BLENDS THEREOF USED IN MAGNETIC RECORDING MEDIA

FIELD OF THE INVENTION

This invention relates to hydroxyl functional polyurethane polymers having carboxylic acid group(s) derived from the cyclic anhydride of a diacid having a pKa of less than about 1.5 pendant from the polyurethane polymer backbone wherein the acid content is about 0.01 to about 0.3 millequivalents acid per gram of polymer. The invention also relates to hydroxyl functional polyurethanes prepared from vinyl macromonomer diols having, in addition, a carboxylic acid group derived from the cyclic anhydride of a diacid having a pKa of less than about 2. The invention further relates to the use of the aforementioned polymers and their blends in magnetic recording media. The strong carboxylic acid groups are particularly effective in promoting strong interaction with difficult to disperse pigments such as barium ferrite.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 85% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable.

There are a number of reasons for using as little dispersant as possible. Dispersants tend to soften binder systems, decrease their toughness, and adversely affect their cure. Binders without dispersants can be more readily and reproducibly prepared. Further, excess dispersant may bloom from a cured binder system over time, leading to contamination of a recording head or the like, causing a change in the physical or chemical characteristics of the media.

To help alleviate these problems with added dispersants, binder compositions having internal (chemically bound) dispersants have been developed. Such compositions comprise polymers with functional moieties pendant from the polymer backbone that help disperse the magnetizable pigment. As a result of using these compositions, less dispersant or, in some instances, no dispersant is needed for dispersion of magnetic pigment in the binder. However, in spite of these improvements, a higher degree of pigment-polymer interaction is desired, particularly in the case of pigments exhibiting small particle size, such as barium ferrite.

Recently, sulfonated hydroxy-functional polyurethane-containing binder systems have been described which exhibit excellent pigment loading and magnetic orientation (U.S. Pat. Nos. 5,071,578 and 5,085,941, both assigned to 3M). However, these sulfonated polyurethane binder systems are less effective in dispersing barium ferrite (BaFe) pigments, a class of pigments of increasingly important commercial consideration.

Polyurethane polymers containing pendant carboxylic acid groups are known in the art. However none have been disclosed which combine pKa less than about 1.5 with a level of carboxylic acid functionality of about 0.01 to about 0.3 millequivalents per gram. Polymers formed from anhydrides wherein the acid pKa is greater than 1.5 and/or which have a carboxylic acid functionality of greater than about 0.3 millequivalents per gram would not be useful in magnetic recording media.

U.S. Pat. No. 4,096,127, (to Akzona), discloses preparation of carboxyl-functional polyurethanes by half-esterification of hydroxy groups pendant from the polyurethane backbone with aliphatic or aromatic dicarboxylic acid anhydrides. The resultant ester-acids are converted to salts and used as paper sizing agents. Maleic anhydride (acid pKa= 1.8) is mentioned in the text (col.2, line 33) in a list of anhydrides that can be reacted with a hydroxyl functional polyurethane to give an acid functional material. The examples, however, do not involve any acids having pKas less than 1.5. No applications towards magnetic media are taught.

U.S. Pat. No. 4,983,491 (to Fuji) describes polyurethanes which have pendant acid groups used in a photosensitive composition. The acid functional polyurethanes are prepared by the reaction of polyurethanes containing hydroxyl groups with anhydrides. While some of these compositions as described contain strong acid groups such as tetrachlorophthalic acid pendant from the polyurethane backbone, their acid content is specified as 0.9 to 3.07 meq/g. These compositions are said to be useful for purposes of photoimaging but such high acid levels are 3 to 100 times higher than is suitable for magnetic media applications.

U.S. Pat. No. 4,612,244 (to Sony Corp.) discloses the potential use of a metal salt of hydroxyacetic (glycolic) acid as a component of a polyurethane binder for a backside coating of magnetic recording tape. Glycolic acid has a pKa of 3.8. U.S. Pat. No. 4,613,545 (to Sony Corp.) discloses the possible use of chloroacetic acid to produce carboxyl-functional magnetic binders. This would produce a moiety of pKa similar to glycolic acid. U.S. Pat. No. 4,571,364 (to Fuji Photo Film Co.) discloses polyurethane resins for magnetic binders in which lysine or its salts or 2-alkyl-2-carboxy-1,3-propanediols are incorporated into the polymer. Lysine has a pKa greater than 2. The pKa values for 2-carboxy-1,3-propanediols are typically about 4.4. U.S. Pat. No. 4,788,103 (to Fuji Photo Film Co.) describes a magnetic pigment binder comprising a polyurethane containing a polar group such as a carboxylic acid or a carboxylic acid salt of an unspecified type and pKa. A carboxyl-functional polyurethane resin for magnetic media is commercially available from Sanyo Chemical Industries under the trade name T17503. Japanese Patent Applications JP 03 64,310 and JP 03 64,314, both to Sanyo, describe a urethane binder prepared by using, inter alia, dimethylolpropionic acid or its ammonium salt. Dimethylol propionic acid has a pKa of about 4.4.

U.S. Pat. No. 3,460,984 (to Gevaert-Agfa) describes the use of low molecular with carboxyl containing materials as magnetic dispersants. These are prepared in examples by the reaction of phthalic anhydride or trimellitic anhydride with a hydroxyl containing polyester or polyether. Trimellitic anhydride (acid pKa=2.5) and phthalic anhydride (acid pKa=2.8) are given as examples. We have found that these acid moieties, when pendant from a polyurethane backbone, perform far less well in pigment dispersing and wetting functions than acid moieties with pKa less than 2.0.

Copending U.S. patent application Ser. No. 08/054,511 assigned to the assignee of the present invention describes the use of polyurethanes with chelating carboxyl groups pendant from their backbone as magnetic recording media binders. These carboxyl groups are of weaker acid type and function through multiple adsorption onto pigment surfaces. While many pigments interact well with these polymers, we have found that some pigments of weakly basic surface chemistry are not well dispersed by these or most other polymers.

U.S. Pat. No. 5,244,739, assigned to the assignee of the present invention, describes the use of vinyl polymeric macromonomer diols in polyurethane polymers useful in magnetic recording media. The patent contains no disclosure of strong acid wetting groups pendant from the polyurethanes.

Blends of polyurethanes with vinyl chloride resins are known in the magnetic pigment binder art. Vinyl chloride resins containing polar functionality, especially sulfonate or ammonium salts, are capable of producing good dispersions by themselves, but these resins generally lack sufficient toughness and flexibility for most product applications. Blending of these vinyl chloride resins with polyurethane resins improves toughness of the resulting binder but care must be taken to preserve dispersion quality. Commercially available carboxyl-functional polyurethanes are compatible with vinyl chloride resins but the known carboxyl-functional polyurethanes interact weakly with pigments and produce relatively poor dispersions by themselves and, in general, they degrade the dispersing capability of ammonium or sulfonate functional vinyl chloride resins when blended therewith.

Blends of polyurethanes with nonhalogenated vinyl copolymers are described in copending U.S. patent application Ser. No. 08/054,312, assigned to the assignee of the present invention, which describes their use as magnetic binders. Polyurethanes are needed as blend resins which do not degrade the dispersing capability of the non-halogenated binders when difficult to disperse pigments like some barium ferrites are used.

As can be seen from this review of known references, a variety of carboxylated polyurethanes have been used to prepare magnetic dispersions. All of these materials are binders with weakly acidic carboxylic acid groups of pKa greater than 2, with the majority of examples having pKa values greater than 4. For some weakly basic pigments, these weak acidic polymers are inadequate to provide good dispersions.

SUMMARY OF THE INVENTION

A need thus exists for a polyurethane binder composition which is capable of irreversible binding of pigment particles and which produces smooth, high loading barium ferrite dispersions which provide pigment coatings with low void volume and excellent magnetic and mechanical properties, and which are compatible with, e.g., ammonium or sulfonate functional vinyl chloride resins and non-halogenated hard resins.

We have discovered such polyurethane binders, magnetic media produced therefrom, blends of the polyurethanes with vinyl chloride resins, blends of the polyurethanes with non-halogenated hard resins, and magnetic media produced therefrom.

The present invention provides polyurethanes having carboxylic acid groups derived from the cyclic anhydride of a diacid having a pKa of less than about 1.5 pendant from the polyurethane polymer backbone wherein the acid content is about 0.01 to about 0.3 millequivalents acid per gram of polymer, preferably about 0.05 millequivalents acid per gram of polymer. Acid levels higher than about 0.3 milliequivalents acid per gram would give very poor dispersion quality and rheology.

The polyurethane binders of this invention comprise strong acid polyurethane polymers having pendant carboxylic acid groups derived from cyclic anhydrides of diacids with pKa less than about 2.

We have also discovered a surprising synergistic effect when strong carboxylic acid groups are present in a polyurethane having a vinyl polymeric macromonomer diol copolymerized into the polyurethane backbone. Dispersion and orientation of certain pigments is improved over similar compositions lacking the vinyl polymeric macromonomer diol.

The polyurethanes of the present invention are prepared by the esterification reaction of a cyclic dicarboxylic acid anhydride moiety with hydroxyl groups directly attached to the polyurethane backbone. Specific examples of the cyclic dicarboxylic acid anhydride moieties include but are not limited to those selected from the group consisting of cyclic anhydrides of acids selected from the group consisting of tetrachlorophthalic acid, tetrafluorophthalic acid, tetrabromo phthalic acid, dichlorophthalic acid, and mixtures thereof. Blends of the resulting polyurethanes with vinyl chloride resins such as ammonium vinyl chloride afford superior dispersions and coatings of magnetic pigments, especially heretofore difficult to disperse pigments such as barium ferrite. Without wishing to be bound by theory, we speculate that the superior dispersions and coatings are a result of strong adsorption of the pigment by the polyurethane of the present invention, leading to a stable adsorbed layer and a very strong pigment-polymer bond.

One aspect of the invention relates to a novel carboxylic acid functional polyurethane polymer comprising the reaction product of:

(a) one or more polyisocyanates;

(b) one or more polyols;

(c) one or more compounds selected from the group consisting of cyclic dicarboxylic acid anhydrides derived from acids having pKa less than 1.5; wherein the acid content of the polyurethane is about 0.01 to about 0.3 meq/q; wherein the hydroxyl content of the polyurethane is at least about 0.01 meq/g; and wherein the molar ratio of hydroxyl groups to the sum of isocyanate groups plus anhydride groups of reactants from which the polyurethane is formed is greater than 1:1. Thus, hydroxyl groups present on the reactants must be in excess of the sum of isocyanate and anhydride groups present on the reactants. The reactants can be combined in various ways to produce the polyurethanes of the present invention. For example, (a) and (b) may be allowed to react to completion followed by addition of (c) or, alternatively, (a), (b) and (c) may be added together and allowed to react until all isocyanate and anhydride is consumed. The quantity of (c) must be such that the free acid content in the carboxylic acid functional polyurethane is in the range 0.01 to 0.3 meq/g.

A non-limiting example of such a polymerization is shown below as Reaction I:

REACTION I

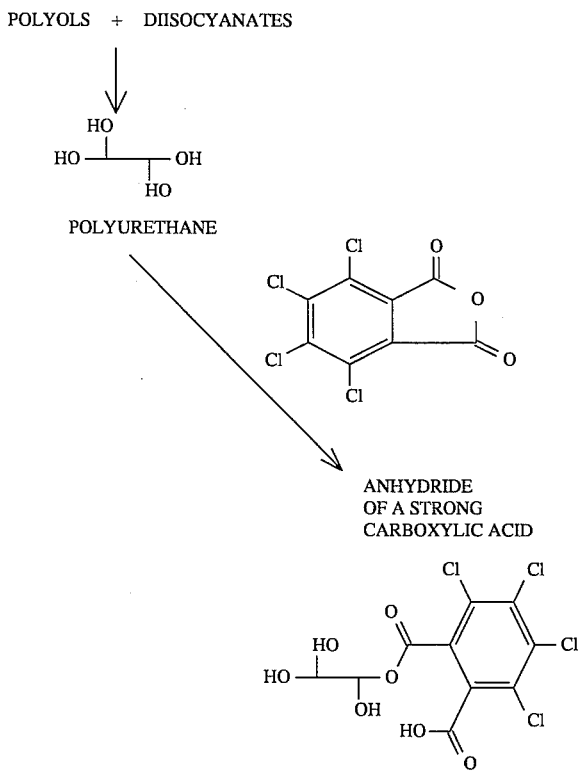

The anhydrides used in the invention may also be generated in situ by the addition of the corresponding 1,2-diacids to reactions where isocyanate is present. This causes rapid conversion of the diacid to the cyclic anhydride.

Another aspect of the invention relates to a novel carboxylic acid functional polyurethane polymer comprising the reaction product of:

(a) one or more polyisocyanates;

(b) one or more polyols;

(c) one or more compounds selected from the group consisting of cyclic dicarboxylic acid anhydrides derived from acids having pKas less than 2; and (d) at least one vinyl polymeric macromonomer diol; wherein the hydroxyl content of the polyurethane is at least about 0.01 meq/g; and wherein the molar ratio of hydroxyl groups to the sum of isocyanate groups plus anhydride groups of reactants from which the polyurethane is formed is greater than 1:1. Preferably the acid context of the aforementioned polymer is about 0.01 to about 0.3 meq/g.

Thus, the hydroxyl groups of the reactants must be in excess of the sum of isocyanate and anhydride groups of the reactants. The reactants can be combined in various ways to produce the polyurethanes of the present invention. For example, (a), (b) and (c) may be allowed to react to completion followed by addition of (d) or, alternatively, (a), (b), (c) and (d) may be added together and allowed to react until all isocyanate and anhydride is consumed.

For magnetic media purposes, the ratio of polyisocyanate to polyol is typically such that the resulting polyurethane is soluble in solvents (i.e., not crosslinked or gelled).

Another aspect of the invention relates to a novel curable binder composition comprising:

a blend of:

(a) a vinyl chloride copolymer resin; and (b) one or both of the carboxylic acid functional polyurethane polymers described above.

Another aspect of the invention relates to a novel curable binder composition comprising:

a blend of:

(a) a non-halogenated vinyl copolymer resin; and (b) one or both of the carboxylic acid functional polyurethane polymers described above.

Another aspect of the invention relates to a magnetic recording medium having a magnetizable layer of pigment particles which are dispersed in a binder, wherein the binder comprises a cured composition as described above.

DETAILED DESCRIPTION OF THE INVENTION

The present invention provides novel carboxyl-functional and hydroxyl functional polyurethane polymers, magnetic media made therefrom, blends of the polyurethane polymers with vinyl chloride copolymer resins, blends of the polyurethane polymers with non-halogenated vinyl copolymer hard resins, and magnetic media made from the blends.

I. Method of Preparing Strong Carboxylic Acid Functional Polyurethane Polymers

One method of preparing a polymer of the present invention comprises the reaction of a cyclic anhydride of a diacid having a pKa less than 1.5 with hydroxyl groups pendant from the backbone of a polyurethane, the polyurethane being produced from the condensation reaction of polyisocyanate(s) with one or more polyols, as defined in Section II, below. One method of preparing another polymer of the invention comprises the reaction of a cyclic anhydride derived from a diacid having a pKa less than 2 with hydroxyl groups pendant from a polyurethane having incorporated therein vinyl polymeric segment(s). The polymers may be prepared in the presence or absence of a solvent. Preferably, the polymerization is carried out in the presence of an organic solvent selected from the group consisting of cyclohexanone, toluene, methyl ethyl ketone, tetrahydrofuran, and mixtures thereof. Most preferably, the solvent is selected from the group consisting of methyl ethyl ketone and tetrahydrofuran.

A catalyst may be added to promote the reaction, e.g., a tin catalyst such as dibutyltin dilaurate. The component polyol(s) and polyisocyanate(s) may be introduced into the reaction medium individually in stepwise fashion in order to decrease the random nature of the copolymer. Alternatively, all of the constituent ingredients may be added to the reaction medium prior to initiating the reaction, in a batch polymerization process, which produces an essentially random copolymeric polyurethane. The order of addition of ingredients may have an effect on the viscosity of the resultant polyurethane, and a skilled practitioner would be able to determine which order will produce a desired viscosity.

Typically, a reaction mixture of one or more diols, dibutyltin dilaurate catalyst, solvent and an excess of a suitable diisocyanate is heated at about 60° C. to about 80° C. with stirring and allowed to react under anhydrous conditions. A triol is added, heat is again applied, and, when infrared analysis shows that no isocyanate remains, the desired cyclic anhydride is added and heating is continued until infrared analysis shows that no anhydride remains. A hydroxyl-functional polyurethane having pendant strong acid groups is obtained.

II(a). Polyol

The term "polyol" as used herein refers to polyhydric alcohols containing two or more hydroxyl groups and includes diols, triols, tetrols, etc.

II(a)(i). Triols

A preferred class of triols comprises polycaprolactone triols. One particularly useful triol is a polycaprolactone triol having a hydroxy equivalent weight of about 180 and a number average molecular weight of approximately 540, available under the trade designation TONE™ 0305 from Union Carbide Company. Other useful triols include polycaprolactone triols other than TONE™ 0305, such as TONE™ 0301 and TONE™ 0310, both available from Union Carbide, polyester triols such as butylene adipate triols, polyether triols such as the poly(propylene oxide) adduct of trimethylol propane known as LHT-240™, from Union Carbide, and simple triols such as trimethylolpropane and glycerol. Tetrafuctional or higher alcohols such as pentaerythritol may also be useful. Preferably the hydroxy groups in the triol are primary in order to facilitate curing of the resultant polymer with a curing agent. It is also foreseen that mixtures of various triols may be utilized.

II(a)(ii). Diols

A variety of diols may be utilized according to the invention including both short chain and long chain diols. Also, mixtures of diols can be used. A preferred class of diols are oligomeric diols defined as diols having a hydroxy equivalent weight greater than about 200 (g/eq). Most preferred are the polycaprolactone diols and polycarbonate diols having a hydroxy equivalent weight of from about 200 to 2,000 (g/eq). Such materials include polyester diols such as TONE™ 0210, available from Union Carbide Company, having a hydroxy equivalent weight of about 415. Another such material is DURACARB™ 120, a polycarbonate diol from PPG Industries Inc. having a number average molecular weight of about 900 (polyhexanediol carbonate).

Other useful diols include but are not limited to those selected from the group consisting of polyether diols such as polytetramethylene glycols and polypropylene glycols; and polyester diols, such as a polyester diol that is the reaction product of a mixture of adipic and isophthalic acids and hexane diol. Preferably, at least some low molecular weight (less than about 200 number average molecular weight) diols are used to provide preferred hardness characteristics to the polymer and the magnetic media prepared therefrom. Examples of these are ethylene glycol; propylene glycol; 1,3-propane diol; 1,4-butane diol; 1,5-pentane diol; 1,6-hexane diol; neopentyl glycol; diethylene glycol; dipropylene glycol; 2,2,4-trimethyl- 1,3-pentane diol; cyclohexane dimethanol; 1,4-cyclohexanedimethanol; ethylene oxide and/or propylene oxide adduct of bisphenol A; and ethylene oxide and/or propylene oxide adduct of hydrogenated bisphenol A. Examples of other diols which may be useful include macromonomer diols, diols having polar functional groups, diols bearing ethylenic unsaturation, such as 3-allyloxy-1,2-propanediol, 1-glyceryl (meth)acrylate, 2-glyceryl (meth)acrylate, 2-methylene- 1,3-propane diol, pentaerythritol di(meth)acrylate, trimethylolpropane monoallyl ether, 2-acrylamido-2-hydroxyethyl-1,3-propanediol, N,N-diallyltartardiamide and N-allyl-2,2'-iminodiethanol, and fluorinated diols such as $C_8F_{17}SO_2N[(CH_2)_2OH]_2$. Fluorinated diols can be used in an amount such that the fluorinated diol comprises about 0.1 to about 20 weight percent of the polymer of the invention. It is further noted that for any of the reactants mentioned, mixtures of materials can be utilized.

II(a)(iii). Vinyl Polymeric Macromonomer Diols

A vinyl polymeric macromonomer diol is, for purposes of this invention, a diol containing a vinyl polymeric segment. It provides a method of incorporating vinyl polymeric segments into polyurethane polymers. These vinyl polymeric macromonomer diols can be prepared by conventional methods known to those skilled in the art, such as those described in Chuyo, Y. et al., *Polymer Bulletin*, 8, 239 (1982). The reference teaches that vinyl monomers may be free radically polymerized in the presence of mercaptopropanediol to give a vinyl polymeric segment terminated by a moiety containing two hydroxyl groups. This gives a diol of the following general structure of Formula II:

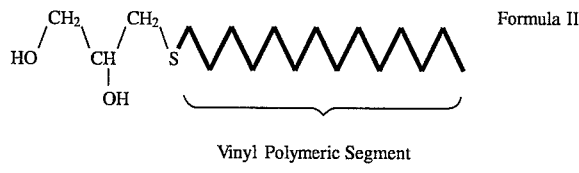

Formula II

Vinyl Polymeric Segment

Vinyl polymeric macromonomer diols may also be prepared by anionic, cationic, and group transfer polymerization methods. It is foreseen that telechelic vinyl polymeric macromonomer diols which are functionalized at both ends of the macromonomer chain as opposed to those possessing difunctionality at one end of the macromonomer chain would work well in preparing the copolymer of the present invention. However, telechelic vinyl polymeric macromonomer diols are less readily available.

The polyurethane backbone typically possesses on average about 0.5 to about 2 pendant polymerized vinyl segments, if included. The weight ratio of the polyurethane backbone to the pendant polymerized vinyl segment(s) ranges from about 99.5:0.5 to about 10:90, preferably about 95:5 to about 20:80. The preferred weight ratio of polyurethane backbone to pendant polymerized vinyl segment(s) for copolymers useful in magnetic recording media preferably ranges from about 95:5 to about 30:70. The number average molecular weight of each pendant polymerized vinyl segment, and thus the vinyl polymeric macromonomer diol used in forming it, typically ranges from about 1000 to about 20,000, preferably about 5000 to about 15,000, in order to obtain the desired phase separation. The glass transition temperature of the pendant polymerized vinyl segment(s) typically range from about −60° C. to about 150° C., preferably about 20° C. to about 120° C. and, for magnetic binder use, typically above about 50° C., preferably about 50° C. to 100° C. in order to obtain the desired hardness, stiffness and dimensional stability.

Some vinyl polymeric macromonomer diols are available commercially. Examples of useful vinyl polymeric macromonomer diols include but are not limited to those available from Toagosei Chemical Industry Co., Ltd. that have a number average molecular weight of about 6000 and possess diol functionality at one end. The vinyl polymeric macromonomer diol can comprise methylmethacrylate monomer, (available under the trade designation HA-6 from Toagosei), styrene monomer (available under the trade designation HS-6 from Toagosei), and a combination of styrene and acrylonitrile monomer (available under the trade designation HN-6 from Toagosei).

Other polymerizable monomers can be used in preparing useful vinyl polymeric macromonomer diols. The monomers used in preparing the vinyl polymeric macromonomer diols should not have any reactive sites toward the polyisocyanates used to prepare the copolymers of the invention. For example, hydroxy ethyl methacrylate macromonomer would not be useful in the present invention since it would result in a gelled product.

Examples of monomers which are useful in preparing the vinyl polymeric macromonomer diols which are useful in preparing the copolymers of the present invention include but are not limited to those selected from the group consisting of styrene, halogenated styrenes, alkylated styrenes, methoxystyrenes, acrylic acid, methacrylic acid, acrylonitrile, acrylamide, methacrylamide, methylmethacrylate, methyl acrylate, ethyl acrylate, isopropyl acrylate, n-butyl acrylate, 2-ethylhexyl acrylate, isobornyl acrylate, glycidyl acrylate, vinyl chloride, vinylidene chloride, vinyl acetate, vinylidene fluoride, N-ethylperfluorooctanesulfonamidoethyl acrylate, N-ethylperfluorooctanesulfonamidoethyl methacrylate, N-butylperfluorooctanesulfonamidoethyl acrylate, N-butylperfluorooctanesulfonamidoethyl methacrylate, N-methylperfluorooctanesulfonamidoethyl acrylate, N-methylperfluorooctanesulfonamidoethyl methacrylate, other acrylic acid esters and amides, other methacrylic acid esters and amides, and mixtures thereof. Preferably, the monomer is selected from the group consisting of styrene, methylmethacrylate, and a mixture of styrene and acrylonitrile.

II(b). Polyisocyanates

A wide variety of polyisocyanates may be utilized according to the present invention. "Polyisocyanates" means any organic compound that has two or more reactive isocyanate (i.e., -NCO) groups in a single molecule that can be aliphatic, alicyclic, aromatic or a combination thereof. This definition includes diisocyanates, triisocyanates, tetraisocyanates, etc., and mixtures thereof. Preferably, diisocyanates are used. Useful diisocyanates include but are not limited to those selected from the group consisting of diphenylmethane diisocyanate, isophorone diisocyanate, toluene diisocyanate, hexamethylene diisocyanate, tetramethylxylene diisocyanate, and p-phenylene diisocyanate. It is noted that mixtures of diisocyanates can also be used.

II(c). Hydroxy Groups

The polymer of the invention possesses hydroxy functionality. It is most preferred but not required that there be on the average more than about 2 hydroxy groups per polymer available for crosslinking purposes. Polymers intended for magnetic binder use preferably have a crosslinkable hydroxy group equivalent weight of from about 500 to about 50,000, most preferably from about 1,000 to about 5,000 (g/eq).

II(d). Cyclic Dicarboxylic Acid Anhydrides

A list of some anhydrides meeting the criteria of the present invention (with pKa values for the corresponding diacids) is given below. It is foreseen that other anhydrides could also be made whose parent diacids showed pKa values less than 2, preferably less than 1.5. It is also foreseen that useful cyclic anhydrides could be generated from the reaction in situ of a 1,2-dicarboxylic acid having a pKa less than about 2 with an isocyanate containing compound.

| DICARBOXYLIC ACID ANHYDRIDE | DIACID pKa |
|---|---|
| 2-CHLOROMALEIC | 0.17 |
| 2,3-DICHLOROMALEIC | 0.64 |
| TETRAFLUORPHTHALIC | <1.0* |
| 3,6-DINITROPHTHALIC | <1.0* |
| TETRAFLUOROSUCCINIC | <1.0* |
| TETRABROMOSUCCINIC | <1.0* |
| TETRACHLOROSUCCINIC | <1.0* |
| CYCLOBUT-1-ENE-1,2-DICARBOXYLIC | 1.12 |
| TETRAIODOPHTHALIC | <1.3* |
| TETRABROMOPHTHALIC | <1.3* |
| TETRACHLOROPHTHALIC | 1.26 |
| 2,3-DIBROMOMALEIC | 1.29 |
| BICYCLO[2.2.1]HEPTA-2,5-DIENE-2,3-DICARBOXYLIC | 1.32 |
| BICYCLO[2.2.1]HEPTA-2-ENE-2,3-DICARBOXYLIC | 1.32 |
| 3,6-DICHLOROPHTHALIC | 1.40 |
| 2,3-DIBROMOSUCCINIC | 1.43 |
| FURAN-3,4-DICARBOXYLIC | 1.44 |
| 2-BROMOMALEIC | 1.46 |
| 4,5-DICHLOROPHTHALIC | <1.5* |
| CYCLOPENT-1-ENE-1,2DICARBOXYLIC | 1.64 |
| MALEIC | 1.83 |
| 3-NITROPHTHALIC | 1.91 |

*Literature values of pKa are unavailable; pKa has been estimated from closely related compounds.

Preferably, the cyclic dicarboxylic acid anhydride is selected from the group consisting of the cyclic anhydrides of acids selected from the group consisting of:

| DICARBOXYLIC ACID ANHYDRIDE | DIACID pKa |
|---|---|
| 2,3-DICHLOROMALEIC | 0.64 |
| TETRAFLUORPHTHALIC | <1.0* |
| TETRABROMOPHTHALIC | <1.3* |
| TETRACHLOROPHTHALIC | 1.26 |
| 2-BROMOMALEIC | 1.46 |
| 4,5-DICHLOROPHTHALIC | <1.5* |
| MALEIC | 1.83 |
| 3-NITROPHTHALIC | 1.91 |

*Literature values of pKa are unavailable; pKa has been estimated from closely related compounds.

The cyclic anhydrides useful according to the present invention can be used to esterify hydroxyl groups pendant from polyurethane polymers to form the polymers of the invention. A non-limiting example of this esterification reaction is identified below as Reaction III:

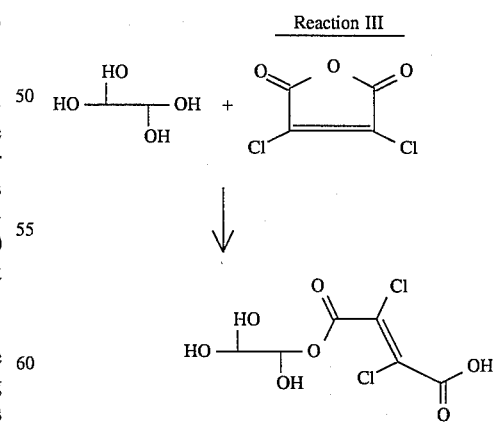

Reaction III

Preferably the polyurethanes of the present invention has at least one pendant group selected from the group consisting of Formula IV, Formula V and combinations thereof, wherein Formula IV is represented by:

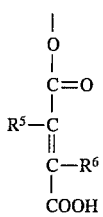

Formula IV wherein $R^5$ is independently selected from the group consisting of —Cl, —Br, —I, —F, and —H;

$R^6$ is independently selected from the group consisting of —Cl, —Br, —I, —F, and —H;

wherein $R^5$ and $R^6$ cannot simultaneously represent —H; and wherein $R^5$ and $R^6$ may alternatively optionally form a cyclopentyl group;

and Formula V is represented by;

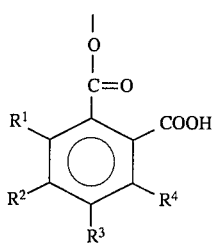

Formula V wherein $R^1$ is independently selected from the group consisting of —Cl, —Br, —I, —F, and —H;

$R^2$ is independently selected from the group consisting of —Cl, —Br, —I, —F, and —H;

$R^3$ is independently selected from the group consisting of —Cl, —Br, —I, —F, and —H;

$R^4$ is independently selected from the group consisting of —Cl, —Br, —I, —F, and —H; and wherein at least two of said $R^1$, $R^2$, $R^3$, and $R^4$ are other than —H.

II(e). Pendant Ethylenically-Unsaturated Groups

Optionally, ethylenically-unsaturated groups which are crosslinkable when subjected to ionizing radiation may be pendant from the polyurethane backbone of the polymer of the invention. Such pendant ethylenically-unsaturated groups may be produced by copolymerization into the polyurethane backbone or by chemical reaction of at least one unsaturated compound which further contains a functional group which is reactive with one or more hydroxyl groups pendant from the polyurethane backbone, as described in section II(c). Copolymerizable ethylenically unsaturated diols include 3-allyloxy-1,2-propanediol, 3-methacryloxy-1,2-propanediol, pentaerythritol diacrylate, and the like. Useful hydroxyl-reactive functional groups include, for example, isocyanate groups, acid chloride groups, and anhydride groups. Useful functional-group containing unsaturated compounds include but are not limited to those selected from the group consisting of isocyanatoethyl methacrylate, allyl isocyanate, alpha, alpha-dimethyl-m-isopropenyl benzylisocyanate, (meth)acryloyl chloride, itaconic anhydride, toluene diisocyanate-hydroxyalkyl (meth)acrylate adducts, and mixtures thereof. The backbone may have one or more pendant ethylenically unsaturated groups, typically a plurality thereof. Blends of polyurethanes of the invention having pendant radiation curable methacrylate group(s) with polyurethanes having radiation curable allyl moieties are particularly useful. Typically a ratio of about 40:60 to 60:40 is used, preferably about 45:55 to 55:45, most preferably about 50:50.

Irradiation may be achieved using any type of ionizing radiation, e.g., electron beam radiation or ultraviolet radiation, in accordance with practices known in the art. Preferably, radiation curing is achieved with an amount of electron beam radiation in the range from about 1 to about 20 Mrads, preferably about 4 to about 12 Mrads, and more preferably about 5 to about 9 Mrads of electron beam radiation having an energy in the range from about 100 to about 400 kev, preferably about 200 to about 250 keV. Although electron beam irradiation can occur under ambient conditions or in an inert atmosphere, it is preferred to use an inert atmosphere as a safety measure in order to keep ozone levels to a minimum and to increase the efficiency of curing. The term "inert atmosphere" as used herein refers to an atmosphere comprising nitrogen or a noble gas and having an oxygen content of less than 500 parts per million ("ppm"). A preferred inert atmosphere is a nitrogen atmosphere having an oxygen content of less than 75 parts per million.

The use of radiation curing techniques may offer some advantages over isocyanate curing techniques. For example, isocyanate curing of magnetic media is chemically unselective and highly dependent on such variables as temperature and humidity, whereas, radiation curing techniques are less sensitive to temperature and humidity.

Traditionally, radiation curable formulations have most commonly relied upon the reactivity of acrylates, methacrylates, and the like to achieve radiation-induced crosslinking. Unfortunately, however, magnetic dispersions prepared from such materials tend to undergo unwanted crosslinking reactions under ambient conditions to form gels, particularly when the magnetic pigment is a metal particle pigment. These dispersions are especially prone to suffer from undesirable crosslinking during dispersion milling.

However, because radiation curable polymers having dispersing groups are capable of wetting/dispersing the magnetic pigment, it would be desirable to include at least some of such polymers in the milling step. In order to accomplish this, radiation curable (meth)acrylate groups may be replaced by allyloxy groups (—O—CH$_2$—CH=CH$_2$), or α-methyl styrene moieties which are more stable to the milling process than (meth)acrylate groups.

We have found, surprisingly, that magnetic pigments that have heretofore been difficult to disperse in magnetic binders known in the art, especially barium ferrite, are readily and thoroughly dispersed in binders comprising the polyurethanes having pendant strong carboxylic acid groups of the present invention. More particularly, the binders of the present invention produce smooth, high loading magnetic pigment dispersions which provide coatings having low void volume and excellent magnetic and mechanical properties.

III. Vinyl Chloride Copolymer

The carboxyl-functional polyurethane polymers of the invention are compatible with a wide range of vinyl chloride copolymers with which they can be optionally blended. The blends can comprise up to about 95 percent by weight of a curable hydroxy functional vinyl chloride copolymer. A curable binder composition blend can be prepared by combining the carboxylic acid functional polymer of the invention with a vinyl chloride copolymer. The blends have a number of advantages. For example, such blends afford a good combination of mechanical properties, particularly hardness and toughness, and superior adsorption onto the surface of magnetic pigments at low polymer concentrations, that is superior to either polymer alone. These properties are due to the sufficient miscibility of the carboxylic acid functional polyurethane polymer of the invention and the vinyl chloride copolymer. The polymer of the invention provides a strong interface with and adhesion to magnetic pigments which leads to improved wear properties of the finished coatings. This combination of good mechanical properties and excellent irreversible bonding to the pigments is not obtained with polyurethane-vinyl copolymer blends known in the art. The curable binder composition of the present invention typically comprises from about 5 percent to about 95 percent by weight of a curable hydroxy functional vinyl chloride copolymer, if used, for good balance of properties, preferably about 25 to about 75 weight percent for superior balance of properties, and most preferably about 45 to about 55 weight percent for even better balance of properties based upon the total weight of the curable binder composition. Preferred vinyl chloride copolymers contain pendant hydroxyl groups to promote solubility, cure and compatibility with other resins. Preferred vinyl chloride copolymers also contain pendant polar groups to aid in the dispersing of pigments, and optionally, epoxy groups to improve heat stability. Other pendant groups may optionally be present to impart desired thermal or mechanical properties.

The vinyl chloride copolymer can be prepared by various polymerization methods, such as emulsion polymerization, solution polymerization, suspension polymerization, and bulk polymerization. In any of such polymerization methods, incremental or continuous addition of a molecular weight control agent, a polymerization initiator, and the monomers for copolymerization may be used when necessary. Preferably the vinyl chloride monomer is present in sufficient amount such that the vinyl chloride copolymer has a vinyl chloride monomer content of at least 60% by weight for reasons of solubility and polymer blend compatibility.

In order to provide vinyl chloride copolymer having a plurality of hydroxyl groups pendant from the polymer backbone, monomers containing free hydroxyl groups are copolymerized into the vinyl chloride copolymer. These monomers should be present in a sufficient amount such that the vinyl chloride copolymer has an hydroxyl equivalent weight of about 500 to about 10,000. Examples of suitable monomers having pendant hydroxyl groups include, for example an alkanol ester of an $\alpha,\beta$-unsaturated acid such as 2-hydroxylethyl acrylate or methacrylate, hydroxypropyl acrylate or methacrylate, an olefin type alcohol such as 3-butene-1-ol, 5-hexene-1-ol, an alkanol vinyl ether such as 2-hydroxyethyl vinyl ether, an acrylamide such as N-methlolacrylamide, N-methylolmethacrylamide, and the like. Alternatively, vinyl acetate units can be copolymerized then partially or fully hydrolyzed to produce vinyl alcohol units.

The vinyl chloride copolymer may contain monomer units having pendant epoxy groups in order to retard dehydrochlorination and thereby improve polymer stability. Examples of suitable monomers include those selected from the group consisting of a glycidyl ether of an unsaturated alcohol such as allyl glycidyl ether, a glycidyl ester such as glycidyl acrylate or methacrylate, an epoxidized olefin such as butadiene monoxide, vinylcyclohexene monoxide, and the like. The epoxy monomer may be used in an amount such that the vinyl chloride copolymer has an epoxy equivalent weight of from about 500 to about 30,000, preferably from about 1,000 to about 20,000, for reasons of maximum effectivity.

It is preferable but not essential that the vinyl chloride copolymer contain dispersing groups to aid in pigment wetting and dispersion. As used throughout this specification, the term "dispersing group" means that a group is capable of wetting the magnetic pigment. A preferred "dispersing group" means a group that is ionized or ionizable at a pH in the range from 2 to 10. Representative examples of suitable dispersing groups include quaternary ammonium moieties (e.g., $-N(CH_3)_3^+Cl^-$ as one example), amines (e.g., $-N(CH_3)_2$ as one example), heterocyclic moieties as described in U.S. Pat. No. 5,081,213, incorporated by reference herein, sulfobetaines (e.g., $-N^+(CH_3)_2(CH_2CH_2CH_2SO_3^-)$), salts or acids based on sulfate (e.g., $-OSO_3Na$ as one example), salts or acids based on sulfonate (e..g., $-SO_3Na$ as one example), salts or acids based on phosphate (e.g., $-OPO(OH)_2$ as one example), salts or acids based on phosphonate (e.g., $-PO(OH)_2$ as one example), salts or acids based on carboxyl (e.g., $-COONa$ as one example), mixtures thereof, and the like. Preferred dispersing groups include those selected from the group consisting of $-SO_3M$, $-NR_3X$, $-NR_2$, $-OSO_3M$, $-COOM$, $-OPO_3M$, and $-PO_3M$ where M is a cation selected from the group consisting of alkali metal cations (e.g. $Na^+$ or $K^+$ etc.), $H^+$, and ammonium cations, R is selected from the group consisting of alkyl comprising 1 to about 30 carbon atoms, aryl, and aralkyl groups, and X is an anion selected from the group consisting of the halogens, sulfates, and sulfonates.

The dispersing groups can be introduced into the vinyl chloride copolymer either through the use of dispersing group containing initiators, dispersing group containing monomers, or by polymer reactions. Whatever method is used, it is desirable that the dispersing groups be present in an amount sufficient to provide a vinyl chloride copolymer having a dispersing group equivalent weight of from about 2,000 to about 100,000 grams polymer per mole of dispersing group, preferably from about 5,000 to about 30,000 grams per mole of dispersing group for reasons of dispersion rheology.

Examples of dispersing group containing initiators include but are not limited to those selected from the group consisting of 4,4'-azobis(4-cyanovaleric acid), succinic acid peroxide, potassium persulfate, and sodium perphosphate. These materials initiate vinyl chloride polymerization and produce terminal carboxyl, sulfate or phosphate groups in the process.

Preferred monomers containing dispersing groups include those selected from the group consisting of acrylic and methacrylic esters and amides, anhydrides, and styrenic monomers. Preferred dispersing groups are quaternary ammonium, sulfonate, phosphate and carboxyl. Certain combinations of these dispersing group containing monomers are also advantageous, for example quaternary ammonium and phosphate. Methacryloxyethyl trimethyl ammonium chloride, methacryl oxyethyl acid phosphate, acrylamidopropyl sodium sulfonate, sodium styrene sulfonate, acrylic or methacrylic acid, maleic anhydride, and maleic acid are some particularly preferred vinyl comonomers. Examples of useful dispersing group containing monomers include but are not limited to those selected from the group consisting of acrylic acid, methacrylic acid, vinyl sulfonic acid, styrene sulfonic acid, 2-acrylamido-2-methyl-1-propanesulfonic acid, dimethylaminoethyl methacrylate, maleic anhydride, phosphate ester of 2-hydroxyethyl methacrylate, methacryloxyethyl trimethylammonium chloride, salts thereof, and mixtures thereof.

Examples of polymer reactions to produce dispersing groups are:

(i) reaction of succinic anhydride with hydroxyl groups on a vinyl chloride copolymer to produce pendant acid functionality; and (ii) reaction of tertiary amines with epoxy groups on a vinyl chloride copolymer to produce quaternary amines.

Other types of monomers amenable to copolymerization include those selected from the group consisting of various kinds of vinyl esters such as vinyl acetate, vinylidene chloride, acrylonitrile, methacrylonitrile, styrene, acrylate and methacrylate esters such as methyl acrylate, ethyl acrylate, butyl acrylate, and butyl methacrylate and other unsaturated monomers such as vinyl ethers, acrylamide, methacrylamide, maleic anhydride, and mixtures thereof.

Some preferred vinyl chloride copolymer resins are described in U.S. Pat. No. 4,816,683, (assigned to Sekisui Chemical). These are copolymers of vinyl chloride, hydroxypropyl acrylate, methacryloxyethyl trimethylammonium chloride, and methyacryloxyethyl phosphate. These are thought to be similar to or the same as the commercially available "S-LEC E-C" resins (E-C130 and E-C110) made by Sekisui Chemical Co. According to information supplied by the vendor, these are approximately 84% vinyl chloride, 16% hydroxy acrylic monomer (by weight) and contain a fraction of a percent of other monomers, including a quaternary ammonium monomer.

Another preferred class of vinyl chloride copolymers are the sulfonated vinyl "MR" resins (MR-110, MR-113, MR-120, and others) commercially available from Nippon Zeon Co. Polymers of this type are described in U.S. Pat. Nos. 4,707,410 and 4,707,411 (assigned to Nippon Zeon), both incorporated by reference herein. A preferred resin approximate composition is as follows: 20,000 sulfonate equivalent weight, 2000 hydroxyl equivalent weight, and 5500 epoxy equivalent weight.

Another useful vinyl chloride copolymer is UCARMAG binder 528 from Union Carbide which contains carboxyl group (about 5600 g/mole) and hydroxyl groups (850 g/mole) and is described in U.S. Pat. No. 4,985,314, incorporated by reference herein.

Vinyl chloride copolymers containing no dispersing group functionality can also be useful in some cases. An example is VAGH from Union Carbide which contains vinyl chloride and hydrolyzed vinyl acetate such that the hydroxyl equivalent weight is about 750 g/mole.

IV. Non-Halogenated Vinyl Polymer

Non-halogenated vinyl polymers such as vinyl copolymers containing no vinyl chloride monomer units, etc., are also very useful as blend resins with the polyurethanes of the present invention. Many of these have the advantage of greater stability over vinyl chloride types, which can dehydrohalogenate under some circumstances. These polymers form particularly good blends with polyurethanes having pendant vinyl polymeric segments of the invention.

The blends can comprise up to about 95 percent by weight of a curable hydroxy functional nonhalogenated vinyl copolymer. The curable binder composition of the present invention typically comprises from about 5 percent to about 95 percent by weight of a curable hydroxy functional nonhalogenated vinyl copolymer, if used, for good balance of properties, preferably about 25 to about 75 weight percent for superior balance of properties, and most preferably 40 to 60 weight percent for even better balance of properties based upon the total weight of the curable binder composition.

Of particular utility are the vinyl copolymers comprising a plurality of pendant nitrile groups, a plurality of pendant hydroxyl groups, and at least one pendant polar group, said copolymers described in copending U.S. patent application Ser. No. 08/054,312, (assigned to the assignee of the present invention), incorporated by reference herein. Representative examples of suitable dispersing groups include quaternary ammonium moieties (e.g., —N(CH$_3$)$_3$$^+$Cl$^-$ as one example), amines (e.g., —N(CH$_3$)$_2$ as one example), heterocyclic moieties as described in U.S. Pat. No. 5,081,213, incorporated by reference herein, sulfobetaines (e.g., —N$^+$(CH$_3$)$_2$(CH$_2$CH$_2$CH$_2$SO$_3$$^+$) as one example), salts or acids based on sulfate (e.g., —OSO$_3$Na as one example), salts or acids based on sulfonate (e.g., —SO$_3$Na as one example), salts or acids based on phosphate (e.g., —OPO(OH)$_2$ as one example), salts or acids based on phosphonate (e.g., —PO(OH)$_2$ as one example), salts or acids based on carboxyl (e.g., —COONa as one example), mixtures thereof, and the like.

Preferred vinyl copolymers are copolymers of monomers comprising (meth)acrylonitrile; a non-halogenated, hydroxyl functional, vinyl monomer; a non-halogenated, vinyl monomer bearing a dispersing group as described above; and one or more other non-halogenated, non dispersing group-containing vinyl monomers.

Representative examples of suitable nonhalogenated, hydroxyl functional, vinyl monomers include an ester of an α,β-unsaturated carboxylic acid with a diol, e.g., 2-hydroxyethyl (meth)acrylate, or 2-hydroxypropyl (meth)acrylate; 1,3-dihydroxypropyl-2-(meth)acrylate; 2,3-dihydroxypropyl-1-(meth)acrylate; an adduct of an α,β-unsaturated carboxylic acid with caprolactone; an alkanol vinyl ether such as 2-hydroxyethyl vinyl ether; 4-vinylbenzyl alcohol; allyl alcohol; p-methylol styrene; and the like. Preferably, the nonhalogenated, hydroxyl functional, vinyl monomer is selected from 2-hydroxyethyl (meth)acrylate, 2-hydroxypropyl (meth)acrylate, and mixtures thereof. Alternatively, vinyl copolymers with pendant hydroxyl groups can also be prepared by incorporating vinyl acetate into the vinyl copolymer and then partially or fully hydrolyzing the acetate moieties to produce hydroxyl groups.

Representative examples of suitable nonhalogenated, vinyl monomers bearing a dispersing group include (meth)acryloyloxyethyl trimethylammonium chloride, (meth)acryloyloxyethyl acid phosphate, (meth)acrylamidopropyl trimethylammonium chloride, (meth)acryloyloxypropyl dimethylbenzylammonium chloride, vinylbenzyl trimethylammonium chloride, 2-hydroxy-3-allyloxypropyl trimethylammonium chloride, (meth)acrylamidopropyl sodium sulfonate, sodium styrene sulfonate, styrene sulfonic acid, (meth)acrylic acid, maleic acid, fumaric acid, maleic anhydride, vinyl sulfonic acid, 2-(meth)acrylamide-2-methyl-1-propanesulfonic acid, dimethylaminoethyl (meth)acrylate, maleic anhydride, N-(3-sulfopropyl)-N-(meth)acryloyloxyethyl-N,N-dimethylammonium betaine, 2-[(meth) acryloyloxy]ethyl trimethylammonium methosulfate, N-(3-sulfopropyl)-N(meth)acrylamidopropyl-N,N-dimethylammonium betaine, vinylbenzyl trimethylammonium chloride, mixtures thereof, and the like.

A dispersing group may also be introduced into the vinyl copolymer using suitable polymer reactions. Examples of suitable polymer reactions to provide the dispersing group include: (1) reaction of succinic anhydride with a portion of the hydroxyl groups on a vinyl copolymer to produce a vinyl copolymer with pendant acid functionality; and (2) reaction of a tertiary amine with the epoxy groups on a vinyl copolymer to produce a vinyl copolymer with pendant quaternary ammonium groups. In order to provide a vinyl copolymer having a pendant epoxy groups for this reaction, nonhalogenated, epoxy functional vinyl monomers may be incorporated into the vinyl copolymer. Such monomers include, for example, glycidyl ether of an unsaturated alcohol such as allyl glycidyl ether, a glycidyl ester such as glycidyl (meth)acrylate, and the like.

Preferred vinyl copolymers of the present invention are copolymers of monomers comprising (meth)acrylonitrile; a nonhalogenated, hydroxyl functional, vinyl monomer as described above; a nonhalogenated, vinyl monomer bearing a dispersing group as described above; and one or more nonhalogenated, nondispersing, vinyl monomers. The term "nondispersing" means that the monomer bears no dispersing group and no hydroxyl group.

Representative examples of suitable other copolymerizable, non-halogenated, non dispersing group-containing, vinyl monomers include styrene; alkylated styrenes; alkoxy styrenes; vinyl naphthalene; alkylated vinyl naphthalenes; alkoxy vinyl naphthalenes; (meth)acrylamides; N-vinyl pyrolidone; linear, branched, or alicyclic alkyl esters of (meth)acrylic acid wherein the alkyl groups contain from 1 to 20, preferably 1–8, carbon atoms, such as methyl (meth)acrylate, n-butyl (meth)acrylate, t-butyl (meth)acrylate, ethyl (meth)acrylate, isopropyl (meth)acrylate, and 2-ethylhexyl (meth)acrylate; vinyl esters of alkanoic acids wherein the alkyl moiety of the alkanoic acids contain 2 to 20, preferably 2 to 4, carbon atoms and may be linear, branched, or alicyclic; isobornyl (meth)acrylate; glycidyl (meth)acrylate vinyl acetate; allyl (meth)acrylate, and the like. Preferred other non-halogenated, non dispersing group-containing, vinyl monomers include styrene, alkyl-substituted styrenes, alkyl (meth)acrylates wherein the alkyl group contains 1 to 4 carbon atoms, and mixtures thereof. Most preferably, the non-halogenated, non dispersing group-containing, vinyl monomer is selected from the group consisting of styrene, methyl methacrylate, ethyl methacrylate, and mixtures thereof.

One particularly preferred non-halogenated vinyl copolymer useful according to the present invention (hereinafter referred to as the "Preferred Vinyl Copolymer") is a non-halogenated vinyl copolymer of monomers comprising 5 to 40, preferably 15 to 40, parts by weight of (meth)acryonitrile; about 30 to 80 parts by weight of one or more nonhalogenated, non dispersing group-containing vinyl monomers; about 5 to 30 parts by weight of a nonhalogenated, hydroxyl functional, vinyl monomer; and about 0.25 to 10, preferably 0.25 to 5, most preferably 0.5 to 2 parts by weight of a nonhalogenated, vinyl monomer bearing a dispersing group, based upon 100 parts total.

For the Preferred Vinyl Copolymer, the dispersing group is preferably selected from quaternary ammonium, acid or salt of carboxyl, acid or salt of phosphate or phosphonate, acid or salt of sulfate or sulfonate, and combinations thereof. More preferably, the dispersing group is quaternary ammonium. When the dispersing group is quaternary ammonium, it is preferred that the vinyl monomer bearing a dispersing group is (meth)acryoyloxyethyl trimethylammonium chloride.

Preferably, the other nonhalogenated, non dispersing group-containing, vinyl monomer of the Preferred Vinyl Copolymer is selected from styrene; an alkyl ester of (meth)acrylic acid wherein the alkyl group of the alkyl ester has 1 to 20 carbon atoms; and a blend comprising styrene and such an alkyl ester wherein the weight ratio of styrene to the alkyl ester is in the range from 10:90 to 90:10. For Preferred Vinyl Copolymers containing such an alkyl ester, the alkyl ester is preferably methyl (meth)acrylate, more preferably methyl methacrylate.

These preferred non-halogenated vinyl copolymers form superior blend binders with the polyurethanes described herein.

V. Dispersions Prepared From Polymer or Polymer Blends for Use in Magnetic Media The binder described herein can be used to prepare magnetic media such as tapes, e.g., video tapes, computer tape and data cartridge tape, and diskettes, both single-sided and double-sided.

A magnetic or magnetizable pigment can be readily dispersed within the polymeric binder of the invention, dispersion being facilitated by the incorporated acidic moiety. The preparation of a dispersion of magnetic pigment within the polymer or polymer blend of the present invention, is relatively straight-forward. A variety of pigments may be used, including but not limited to those selected from the group consisting of ferric oxides; gamma ferric oxide; cobalt doped gamma ferric oxides; chromium dioxide; iron; iron-cobalt; cobalt; nickel; cobalt-nickel; cobalt-phosphorus; barium ferrite; and mixtures thereof.

It is foreseen that a variety of loadings, densities, solvent systems, adjuvants, etc., may be utilized. The following conditions are typical, and were employed in preparation of some of the dispersions reported in the examples below (parts by weight unless otherwise noted: about 100 parts of pigment such as cobalt-doped iron oxide ($Co—Fe_2O_3$) having a surface area 30 $m^2/g$ and a powder coercivity of 950 Oersted; about 15 to 40 parts of binder (i.e., polymer or polymer blend); and about 150 to 400 parts of solvent are combined with about 750 parts of steel or glass milling media in a steel container and milled by agitation until the pigment is dispersed throughout.

The coated and dried dispersion of the present invention can be readily cured. Curing is a process in which crosslinking of the binder polymer or polymer blend takes place and which renders the resulting cured polymers dimensionally stable and essentially insoluble in common organic solvents. One method of cure involves use of multi-functional isocyanate curing agents, the isocyanate groups of which may react with hydroxy groups which may be present on the polymer of the present invention. A curative is typically added after a dispersion comprising pigment, solvent, and binder is prepared. A typical curative comprises, for example, a polyisocyanate such as the adduct of toluene diisocyanate with a mixture of diols and triols including, e.g., trimethylol propane. One such material is available under the trade designation MONDUR™ CB-601 from Mobay Chemical Company. Typical curatives are polyisocyanate compounds, for example polyisocyanates such as MONDUR™ CB-601, MONDUR™ CB-75, MONDUR™ MRS (all available from Mobay Chemical Co.), DESMODUR L™ (available from Bayer A. G.), and CORONATE L™ (available from Nippon Polyurethane). Additional isocyanate curing agents are described in U.S. Pat. No. 4,731,292, incorporated by reference herein. The curative is preferably added in a proportion of about 1 to 20 weight percent based upon the binder weight. The binder weight refers to the weight of the polymer of the invention plus any optional binder such as vinyl chloride copolymer with which it is blended.

The resulting dispersion can be readily applied to a support such as a polyethylene terephthalate (PET) film using a knife coating method. Examples of supports on which the magnetic coating material can be applied include but are not limited to those selected from the group consisting of polyesters such as polyethylene terephthalate and polyethylene-2,6-naphthalate; polyolefins such as polyethylene and polypropylene; derivatives of cellulose such as cellulose triacetate, cellulose acetate butyrate, cellulose acetate propionate; polycarbonate; polyvinyl chloride; polyimides; polyamides; metals such as aluminum and copper; and paper. Immediately after coating and while the solvent is still present and the binder is substantially uncured, the coated substrate typically is subject to a magnetic field to orient the magnetic particles. After coating and orienting, the substrate is dried of solvent and allowed to cure. The curing retains the pigment in the oriented manner. Curing can take place either at room temperature or at elevated temperatures (50°–60° C.).

Another method of cure involves irradiation of a polymeric binder containing radiation-curable moieties such as ethylenically-unsaturated groups. Irradiation of the coated and dried dispersion may be achieved using any type of ionizing radiation, e.g., electron beam radiation or ultraviolet radiation, in accordance with practices known in the art. Preferably, curing is achieved with an amount of electron beam radiation in the range of from about 1 to about 20 Mrads, preferably from about 4 to about 12 Mrads, and more preferably from about 5 to about 9 Mrads of electron beam radiation having an energy level in the range of from about 100 to about 400 keV, preferably from about 200 to about 250 keV. Although electron beam irradiation can occur under ambient conditions or in an inert atmosphere, it is preferred to use an inert atmosphere as a safety measure in order to keep ozone levels to a minimum and to increase the efficiency of curing. "Inert atmosphere" means an atmosphere comprising flue gas, nitrogen, or a noble gas and having an oxygen content of less than 500 parts per million (ppm). A preferred inert atmosphere is a nitrogen atmosphere having an oxygen content of less than about 75 ppm.

A variety of additives known to those skilled in the art can be incorporated into the dispersion of the present invention. The dispersion can further comprise additives including but not limited to those selected from the group consisting of head-cleaning agents, lubricants, dispersants, and wetting agents. It is envisioned that lubricants such as those disclosed in U.S. Pat. Nos. 4,731,292 and 4,784,907, both incorporated by reference herein, could be added to obtain desired frictional and processing characteristics. Examples of useful lubricants include but are not limited to those selected from the group consisting of $C_{10}$ to $C_{22}$ fatty acids, $C_1$ to $C_{18}$ alkyl esters of fatty acids, and mixtures thereof. Other examples of useful lubricants include those selected from the group consisting of silicone compounds such as silicone oils, fluorochemical lubricants, fluorosilicones, and particulate lubricants such as powders of inorganic or plastic materials. Preferred lubricants include those selected from the group consisting of myristic acid, stearic acid, palmitic acid, and butyl and amyl esters thereof. Typically mixtures of lubricants are used, especially mixtures of fatty acids and fatty esters.

If the binder described herein is used as a back-coat for magnetic media, the back-coat can optionally further comprise non-magnetizable pigments, such as, for example, those selected from the group consisting of carbon black, graphite, aluminum oxide, titanium dioxide, zinc oxide, silica gel, calcium carbonate, barium sulfate, and mixtures thereof.

The dispersion may further comprise an effective amount of a suitable dispersing agent, preferably about 1 to about 10 weight percent based upon pigment weight in order to disperse the pigment. Suitable dispersants include but are not limited to those selected from the group consisting of lethicin and quaternary ammonium acetates or phosphates such as EMCOL™ acetate, a polypropylene oxide adduct of diethyl ethanolamine quaternized with ethylene oxide and acetic anhydride, having a number average molecular weight of about 2300, and EMCOL™ phosphate, a polypropylene oxide adduct of diethyl ethanolamine quaternized with ethylene oxide and phosphoric acid. Both are available from Witco Chemical Co. and are disclosed in U.S. Pat. No. 4,837,082, incorporated by reference herein.

The dispersion may further comprise about 1 to about 10 weight percent of a wetting agent based upon the weight of the pigment. Suitable wetting agents include but are not limited to those selected from the group consisting of phosphoric acid esters such as mono-phosphorylated propylene oxide adducts of glycerol, e.g., the reaction product of 1 mole of phosphorous oxychloride with the reaction product of 10–11 moles of propylene oxide and 1 mole of glycerine.

Examples of useful head cleaning agents include but are not limited to those disclosed in U.S. Pat. Nos. 4,784,914 and 4,731,292, both incorporated by reference herein. Examples of such head cleaning agents include but are not limited to those selected from the group Consisting of alumina, chromium dioxide, alpha iron oxide, and titanium dioxide particles of a size less than about 2 microns which have a Mohs hardness of greater than about 5 and which are added in an amount ranging from about 0.2 to about 20 parts per hundred parts of magnetic pigment.

The detailed description includes exemplary preparations of the polymer and polymer blends in accordance with the invention and dispersions prepared therefrom. All parts, percentages, ratios, etc., throughout the Specification, including the Examples, are by weight unless otherwise indicated. In the following examples, the following agents are used:

TONE™ 0210—a polycaprolactone diol produced by Union Carbide, number average molecular weight about 825, hydroxy equivalent weight about 415.

TONE™ 0305—a polycaprolactone triol available from Union Carbide, number average molecular weight about 540, hydroxy equivalent weight about 180.

Neopentyl glycol—2,2-dimethyl-1,3-propanediol

MDI—4,4'-Diphenylmethane diisocyanate

MONDUR™ CB-601—a triisocyanate available from Mobay Chemical Company. CB-601 is a toluene diisocyanate-based adduct of unspecified triols and diols which contains 10.4 percent NCO and is supplied as a 60 percent solution in ethylene glycol diacetate.

MEK—methylethyl ketone

HN-6—styrene/acrylonitrile macromonomer diol having a molecular weight of about 6000 available from Marubeni Specialty Chemicals, Inc.

DBTDL—Dibutyltin dilaurate, a catalyst

TCPA—Tetrachlorophthalic anhydride

TFPA—Tetrafluorophthalic acid

DCMA—2,3-Dichloromaleic anhydride

3-NPA—3-nitrophthalic anhydride

TMA—trimellitic anhydride

DABCO—diazabicyclooctane, a catalyst

IEM—2-isocyanatoethyl methacrylate

TMI—1-(1-isocyanato-1-methyl ethyl)-4-(1-methyl ethenyl)benzene, a compound with an isocyanate group and a radiation curable isopropenyl group available from American Cyanamide Company E-C130—Vinyl chloride copolymer available from Sekisui Chemical Co., Ltd.

Sanyo TI 7503—A carboxyl-functional polyurethane resin for magnetic media commercially available from Sanyo Chemical Industries, Ltd.

DEFINITION OF TERMS

Equivalent Weight

The term "equivalent weight" or "Eq. Wt.", as used herein with respect to a functionality or moiety, refers to the mass of polymer per mole, or equivalent, of functionality.

Squareness Ratio

The squareness ratio (Br/Bm), which is the ratio of the remnant saturation induction, or residual magnetization (Br), to the saturation induction, or saturation magnetization (Bm), refers to the effectiveness of the orientation of the magnetic particles in a dispersion. For randomly-oriented particles, the squareness ratio is 0.5 and for ideally and perfectly oriented particles, the ratio is equal to 1.0, thus the higher the value the better.

pKa

$$pKa = -\log\left[\frac{[H^+][HA^-]}{H_2A}\right]$$

where

[$H_2A$] is the concentration of the doubly protonated form of the diacid;

[$HA^-$] is the concentration of the monoprotonated form of the diacid; and

[$H^+$] is the hydronium ion concentration.

Inherent Viscosity

The inherent viscosity of each composition was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.5 grams per deciliter of polymer in tetrahydrofuran solvent) and the flow time of the solvent. In each experiment, inherent viscosity is reported in deciliters per gram.

ICI Viscosity

The ICI viscosity of various magnetic media binder dispersions of the invention were measured on an ICI Rotating Cone and fixed plate viscometer from Research Equipment, Ltd. (London) which provided a measurement of viscosity in centipoise.

Low Shear Viscosity

The low shear viscosity of various magnetic media binder dispersions of the invention was determined by inspection of dispersion samples after sitting 24 hours, for presence of a gel structure (i.e. high viscosity) or absence of a gel structure and the ability to flow when subjected to pouring.

Stability

The stability of various magnetic media binder dispersions was determined by microscopic examination of the dispersions after 1 week.

Smoothness

The smoothness of various magnetic media binder dispersions was determined by microscopic examination and refers to the substantial absence of any visible discrete particles. The dispersion uniformity was judged qualitatively.

Gloss

"Gloss" refers to the percentage of light incoming at 45° that is reflected at an observation angle of 45° measured via a Pacific Scientific Glossgard II 45° glossmeter.

Gn

Gn is a dimensionless measure of coercivity distribution given by the expression:

$$Gn = (Hc)/(\Delta Hc)$$

where $\Delta Hc$ is the width of the coercivity range at ½ peak height. Gn is the reciprocal of the switching field distribution.

EXAMPLES

Procedure for Preparation of Strong Acid Polyurethanes of Examples 1,2,3 and Acid Polyurethane Comparative Example 1

To an appropriately sized flask were added Tone™ 0210, neopentyl glycol, methylethyl ketone, diphenylmethane diisocyanate, and catalyst. The mixture was heated for 3 hours at reflux. Tone™ 0305 triol and the anhydride were then added along with additional solvent and the heating was continued until no isocyanate or anhydride remained, as determined by infrared spectroscopy. The product in each case was an acid and hydroxyl functional polyurethane.

Examples 1–3 and Comparative Example 1 differed in the selection of anhydride. The Comparative Example 1 had a pKa of 2.49, whereas the pKas of the anhydrides of Examples 1–3 were 1.91, <1.0, and 1.26, respectively. The polyurethanes of the invention of Examples 1–3 and the polyurethane of Comparative Example 1 were made by the general procedure outlined above using the following charges in grams (with equivalents in parentheses) found in Table A.

TABLE A

| Reactant | Ex 1 | Ex 2 | Ex 3 | Comp. Ex 1 |
|---|---|---|---|---|
| Tone™ 0210 | 55.9 (0.132) | 55.9 (0.132) | 140.1 (0.33)) | 55.9 (0.132) |
| Neopentyl Glycol | 11.7 (0.225) | 11.7 (0.225) | 35.8 (0.689) | 11.7 (0.225) |
| Methylethyl Ketone | 193 | 193 | 528 | 193 |
| MDI | 59.3 (0.475) | 59.3 (0.475) | 169.4 (1.355) | 59.3 (0.475) |
| DBTDL | 0.1 | 0.1 | 0.2 | 0.1 |
| Tone™ 0305 | 39.4 (0.219) | 39.4 (0.219) | 123.9 (0.626) | 39.4 (0.219) |
| Methylethyl Ketone | 59 | 59 | 186 | 59 |
| Anhydride Type | 3-NPA | TFPA | TCPA | TMA |
| Anhydride Weight | 1.6 (.009) | 2.0 (.009) | 6.9 (0.024) | 1.6 (.009) |
| Polymer Characteristics | | | | |
| Inherent Viscosity dl/g | 0.27 | 0.27 | 0.25 | 0.35 |
| Acid Content (calculated) 20,000 g/eq | 20,000 g/eq | 20,000 g/eq | 20,000 g/eq | 20,000 g/eq |
| Hydroxyl Content (calculated) | 1800 g/eq | 1100 g/eq | 1800 g/eq | 1800 g/eq |

For Example 2, tetrafluorophthalic acid was used in place of tetrafluorophthalic anhydride, which was generated in situ under the conditions of the reaction as described previously.

Procedure for Preparation of Macromonomer Polyurethanes of Examples 4–9 and Comparative Examples 2–4

To an appropriately sized flask were added Tone™ 0210, HN-6 macromonomer, neopentyl glycol, methylethyl ketone, diphenylmethane diisocyanate and catalyst. The mixture was heated for 3 hours at reflux. Tone™ 0301 or Tone™ 305 triol and the appropriate anhydride were then added along with additional solvent and the heating was continued until no isocyanate or anhydride remained, as seen by infrared spectroscopy. The products were an acid and hydroxyl functional polyurethane.

The components and charges for Examples 4–9 are indicated in Table B in grams (with equivalents in parentheses).

The components and charges for Comparative Examples 2–4 are shown in Table C in grams (with equivalents in parentheses). Examples 4–9 differed from Comparative Examples 2–4 as follows. Examples 4–5 both contain the preferred acid groups at 20,000 g/eq and 50% by weight styrene acrylonitrile macromonomer. Example 6 contains 25% macromonomer with a preferred acid. Examples 7–9 contain the same (25%) amount of macromonomer but have 5000, 20,000, and 75,000 equivalent weight of preferred acid group. Comparative Example 2 is the 25% macromonomer level with no wetting group present. Comparative Example 3 is 25% macromonomer with phthalic anhydride (pKa=2.9) wetting group and Comparative Example 4 is 25% macromonomer with succinic anhydride wetting group (pKa=4.2).

Preparation of Non-Halogenated Hard Resin—"10"

The following is a method of preparation of a non-halogenated hard resin useful for blending with strong acid polyurethanes.

Styrene (161.25 g), acrylonitrile (50.0 g), hydroxypropyl acrylate (37.5 g), methyacryloyloxyethyl trimethylammonium chloride (1.25 g), 3-mercapto-1,2-propanediol (0.5 g), methylethylketone (375 g), and azobisisobutyronitrile (1.25 g) were charged into a 1 liter amber reaction bottle. The resultant admixture, which contained some undissolved methacryloyloxyethyl trimethyl ammonium chloride, was purged with $N_2$ for 7 minutes at 1 liter per minute, after which the bottle was sealed. The sealed bottle and its contents were tumbled in a constant temperature bath, at 65° C. to 70° C. for 80 hours. The product was a clear, homogeneous solution.

TABLE B

| Reactant | Ex 4 | Ex 5 | Ex 6 | Ex 7 | Ex 8 | Ex 9 |
|---|---|---|---|---|---|---|
| Tone™ 0210 | 31.1 (0.073) | 30.8 (0.073) | 149.5 (0.352) | 28.4 (0.067) | 150.8 (0.355) | 28.4 (0.067) |
| Neopentyl Glycol | 1.0 (0.019) | 1.2 (0.023) | 12.2 (0.234) | 7.3 (0.141) | 34.8 (0.670) | 7.3 (0.141) |
| HN-6 Macromonomer Diol | 70 (0.04) | 70 (0.04) | 120 (0.069) | 33.3 (0.013) | 171.1 (0.068) | 33.3 (0.013) |
| Methylethyl Ketone | 238 | 238 | 608 | 157 | 816 | 157 |
| MDI | 24.3 (0.195) | 24.9 (0.199) | 118.7 (0.95) | 35.9 (0.287) | 177.61 (1.421) | 35.9 (0.287) |
| DBTDL | 0.01 | 0.01 | 0.2 | 0.01 | 0.3 | 0.01 |
| Triol | Tone™ 0301 | Tone™ 0301 | Tone™ 0301 | Tone™ 0305 | Tone™ 0305 | Tone™ 0305 |
| Triol Weight | 10.9 (0.111) | 11.2 (0.114) | 66.5 (0.678) | 26.49 (0.147) | 131.2 (0.729) | 26.49 (0.147) |
| Methylethyl ketone | 20 | 21 | 100 | 40 | 197 | 40 |
| Anhydride | TCPA | DCMA | 3-NPA | TCPA | TCPA | TCPA |
| Anhydride Weight | 2 (0.007) | 1.2 (0.007) | 4.63 (0.024) | 7.6 (0.027) | 9.8 (0.034) | 0.51 (0.002) |
| DABCO | | | | 0.1 | | 0.1 |
| Inherent Viscosity dl/g | 0.206 | 0.187 | 0.43 | 0.30 | 0.30 | 0.32 |
| Acid Content g/eq (calculated) | 20,000 | 20,000 | 20,000 | 5,000 | 20,000 | 75,000 |
| Hydroxyl Content g/eq (calculated) 2,000 | 2,000 | 2,000 | 2,000 | 2,000 | 2,000 | |

TABLE C

| Reactant | Comp. Ex 2 | Comp. Ex 3 | Comp. Ex 4 |
|---|---|---|---|
| Tone™ 0210 | 36.2 (0.085) | 36.2 (0.085) | 36.2 (0.085) |
| Neopentyl Glycol | 9.3 (0.179) | 9.3 (0.179) | 9.3 (0.179) |
| HN-6 Macromonomer diol | 42.5 (0.017) | 42.5 (0.017) | 42.5 (0.017) |
| Methylethyl Ketone | 201 | 201 | 201 |
| MDI | 45.8 (0.366) | 45.8 (0.366) | 45.8 (0.366) |
| DBTDL | 0.1 | 0.1 | 0.1 |
| Triol | Tone™0305 | Tone™ 0305 | Tone™ 0305 |
| Triol Weight | 33.8 (0.188) | 33.8 (0.188) | 33.8 (0.188) |
| Methylethyl Ketone | 51 | 51 | 51 |
| Anhydride | None | PA | SA |
| Anhydride Weight | | 1.26 (0.009) | 0.85 (0.009) |
| DABCO | | 0.1 | 0.1 |
| Inherent Viscosity dl/g | 0.33 | 0.33 | 0.33 |
| Acid Content (calculated) | | 20,000 g/eq | 20,000 g/eq |
| Hydroxyl Content (calculated) | 2,000 g/eq | 2,000 g/eq | 2,000 g/eq |

Procedure for Preparing and Coating Dispersions

In order to prepare dispersions of magnetic pigment in binders of the invention, the ingredients as noted were separately introduced into a ball mill using steel media and dispersed therein for two hours. Each resulting dispersion was applied to a 100 micrometers thick polyethylene terephthalate film using a knife coater and the resulting coated films were allowed to stand in a parallel magnetic field of 1800 Gauss for about one second immediately after coating. On drying, the magnetic layers had thicknesses of about 4–5 micrometers.

Examples 11(a–e) and Comparative Example 11f

Preparation of Dispersion of Iron Oxide Pigment

The Procedure for Preparing and Coating Dispersions was used with the following charges, which were the same, except that the polymer binder was varied. The binders selected and the dispersion properties are reported in Table D.

| Pigment | Parts by Weight |
|---|---|
| Cobalt doped Fe$_2$O$_3$ ISK9966 | 81 |
| Polymer | 27 |
| Methylethyl Ketone | 192 |

TABLE D

| Ex. | Binder Example | pKa | Squareness | Smoothness | Stability | Low Shear Viscosity |
|---|---|---|---|---|---|---|
| 11a | 1 | 1.9 | 0.72 | GOOD | HIGH | LOW |
| 11b | 2 | 0.8 | 0.76 | GOOD | HIGH | LOW |
| 11c | 7 | 1.3 | .70 | GOOD | HIGH | HIGH |
| 11d | 8 | 1.3 | .80 | GOOD | HIGH | LOW |
| 11e | 9 | 1.3 | .63 | LOWER | LOWER | HIGH |
| Comp. 11f | Comp. 1 | 2.5 | 0.71 | LOWEST | LOWEST | HIGH |

These results in Table D show that the 3 polyurethanes containing pendant acid groups in the preferred pKa range and the preferred range of concentration (Examples 1, 2, 7, 8) derived gave good dispersions of this pigment. Comparative Example 11f (outside of the pKa range) gave a rough dispersion, and the sample with a low dispersing group (Example 9) level (Example 9) gave a less than optimum result.

Examples 12a–c

Preparation of Dispersion of Barium Ferrite Pigment

The Procedure for Preparing and Coating Dispersions was used with the following charges which were the same except that the polymer binder was varied. The binders selected and the dispersion properties are reported in Table E.

| Pigment | Parts by Weight |
|---|---|
| Barium Ferrite TODA 50100 | 150 |
| Polymer | 26.5 |
| Methylethyl Ketone | 265.2 |

TABLE E

| Ex. | Binder Example | pKa | Squareness | Smoothness | Stability | Low Shear Viscosity |
|---|---|---|---|---|---|---|
| 12a | 4 | 1.26 | 0.820 | GOOD | HIGH | LOW |
| 12b | 5 | 0.64 | 0.800 | GOOD | HIGH | HIGH |
| 12c | 6 | 1.91 | 0.807 | GOOD | HIGH | HIGH |

The data in Table 8 demonstrates that all of these polymers containing the specified acidic groups and macromonomer chains gave very good dispersions of this pigment.

Examples 13a–d

Preparation of Barium Ferrite Dispersions

The Procedure for Preparing and Coating Dispersions was used with the following charges which were the same except that the polymer binder was varied. The binders selected and the dispersion properties are reported in Table F.

| Pigment | Parts by Weight |
|---|---|
| Barium Ferrite TODA T3575 | 86 |
| Polymer | 14 |
| Methylethyl Ketone | 150 |

TABLE F

| Ex. | Binder | Squareness | Smoothness | GN | Stability |
|---|---|---|---|---|---|
| 13a | Ex. 3 | 0.662 | GOOD | 2.73 | HIGH |
| 13b | Ex. 3/E-C130 50/50 | 0.898 | GOOD | 7.22 | HIGH |
| 13c | Ex. 3/E-C130 30/70 | 0.844 | GOOD | 7.23 | HIGH |
| 13d | Ex. 4 | 0.865 | GOOD | 7.54 | HIGH |

These polyurethanes and their blends with the vinyl chloride copolymer E-C130 gave good dispersions with this pigment.

Example 14a–d

The procedure of Example 13 was repeated using barium ferrite pigment 550140 from Toda in place of T3575. The results are reported in Table G.

TABLE G

| Ex. | Binder | Squareness | Smoothness | GN | Stability |
|---|---|---|---|---|---|
| 14a | Ex. 3 | 0.845 | GOOD | 3.73 | HIGH |
| 14b | Ex. 3/E-C130 50/50 | 0.868 | GOOD | 3.98 | HIGH |
| 14c | Ex. 3/E-C130 30/70 | 0.840 | GOOD | 3.68 | HIGH |
| 14d | Ex. 4 | 0.905 | GOOD | 5.7 | HIGH |

These polyurethanes and their blends with the vinyl chloride copolymer E-C130 gave good dispersions with this pigment.

The procedure of Example 13 was repeated to compare the binder of Example 4 with a blend of commercially available polymers. The binders selected and the dispersion properties are reported in Table H.

TABLE H

| Example | Binder | ICI Viscosity | GN |
|---|---|---|---|
| 15a | Ex. 4 | 15 | 1.91 |
| Comp. 15b | Sanyo T17503/E-C130 50/50 | 25 | 1.21 |

The polymer of the invention is superior when compared to the commercially available TI7503 polymer having a carboxyl group with pKa greater than 2.0.

Example 16a and Comparative Example 16b

The procedure of Example 15 was repeated using cobalt doped iron oxide pigment ISK9966 in place of ferrite pigment T3575. The charges were the same except that the polymer binder was varied. The binders selected and the dispersion properties are reported in Table I.

TABLE I

| Ex. | Binder | ICI Viscosity | Squareness | GN |
|---|---|---|---|---|
| 16a | Ex. 4 | 15 | .864 | 2.28 |
| Comp. 16b | Sanyo T17503/ E-C130 50/50 | 20 | .812 | 2.12 |

The data in the Table I demonstrates that the polymer of the invention is superior when compared to the commercially available TI7503 polymer having a carboxyl group with pKa greater than 2.0.

Example 17

Preparation of Barium Ferrite Dispersions

The Procedure for Preparing and Coating Dispersions was used with the following charges which were the same except that the polymer binder was varied. The binders selected and the dispersion properties are reported in Table J.

| Pigment | Parts by Weight |
|---|---|
| Barium Ferrite TODA T30100 | 150 |
| Polymer | 26 |
| Methylethyl Ketone | 265 |

Preparation of a Non-Halogenated Resin "A"

The following ingredients were charged into an approximately 1 liter metric amber reaction bottle. The resultant admixture, which contained some undissolved methacryloyloxyethyl trimethyl ammonium chloride, was purged with $N_2$ for 7 minutes at 1 liter per minute, after which the bottle was sealed. The sealed bottle and its contents were tumbled in a constant temperature bath, at 65° C. or 70° C. for 80 hours. The product contained a nonhalogenated vinyl copolymer.

| Ingredient | Parts by Weight |
|---|---|
| Styrene | 150.0 |
| Acrylonitrile | 103.5 |
| Hydroxypropyl Acrylate | 45.0 |
| Methacryloyloxypropyl Trimethyl Ammonium Chloride | 1.5 |
| 3-Mercapto-1,2-propanediol | 0.6 |
| Methylethyl Ketone | 338 |
| Azobis Isobutyronitrile | 1.8 |

Example 18

Preparation of Polyurethane with TCPA Wetting Groups and Pendant Radiation Curable Allyloxy Moieties To a 2-liter flask were added 223.2 g TONE™ 0210 polycaprolactone diol available from Union Carbide Corp. (0.525 equivalent), 28.5 g neopentyl glycol (0.548 equivalent), 26.4 g of 3-allyloxy-1,2-propanediol available from Aldrich Chemical Co. (0.400 equivalent), 250.0 grams HN6 macromonomer (0.100 equivalents) and 792 g MEK. 200 g MEK were distilled off to dry the mixture. Next 505 grams MEK and 255.7 g diphenylmethane diisocyanate (2.045 equivalents) were added followed by 0.2 g dibutyltin dilaurate. The mixture was heated at 75 degrees C. for 2 hours. Then 188.8 g TONE™ 0305 polycaprolactone triol available from Union Carbide Corporation (1.049 equivalent) and 283 g MEK were added and the reaction mixture was heated at reflux for 1 hour. Then 14.3 g tetrachlorophthalic anhydride (0.050 equivalents) was added and held at 75 degrees C for hour. The inherent viscosity of the resultant polyurethane polymer in tetrahydrofuran was 0.28 dl/g. The polymer was calculated to have a hydroxyl equivalent weight of 2100, an allyloxy equivalent weight of 5000, and a tetrachlorophthalic acid equivalent weight of 20,000.

TABLE J

| Ex. | Binder Example | Squareness | Smoothness | Gloss | Low Shear Viscosity | Stability |
|---|---|---|---|---|---|---|
| 17a | 7 | 0.78 | GOOD | 16 | LOW | GOOD |
| Comp. 17b | COMP 2 | 0.60 | POOR | 0 | LOW | POOR |
| Comp. 17c | COMP 3 | 0.62 | POOR | 5 | HIGH | POOR |
| Comp. 17d | COMP 4 | 0.70 | POOR | 1 | HIGH | POOR |
| 17e | 7/10* (50/50 WT RATIO) | 0.77 | GOOD | 32 | LOW | GOOD |
| Comp. 17f | COMP 2/10* (50/50 WT RATIO) | 0.76 | GOOD | 42 | LOW | POOR |

*Binder 10 refers to Non-Halogenated Hard Resin-"10"

Example 19

Conversion of Comparative Example 2 Into a Polyurethane with TCPA Wetting Groups and Pendant Radiation Curable IEM Moieties To 2500 g of a 39.7% solution of the polyurethane of Comparative Example 2 in methyl ethyl ketone was added 66.4 g (0,428 equivalent) of IEM and a few drops of DBTDL. The solution was heated at 60° C. until infrared analysis showed that the IEM had been completely consumed (about 4 hours). Then 14.3 g tetrachlorophthalic anhydride (0.050 equivalent) was added and held at 60° C. for 1 hour. The calculated equivalent weights were as follows: 5800 methacrylate, 20,000 tetrachlorophthalic acid, 2100 hydroxyl. The final inherent viscosity was 0.3 dl/g.

Example 20

Conversion of Comparative Example 2a Into a Polyurethane with TCPA Wetting Groups and Pendant Radiation Curable TMI Moieties To 1270 g of a 39.7% solution of the polyurethane Comparative Example 2 in methyl ethyl ketone was added 49.2 g (0,245 equivalent) of TMI and a few drops of dibutyl tin dilaurate. The solution was heated at 75° C. until infrared analysis showed that the TMI had been completely consumed (about 10 hours). Then 7.3 g tetrachlorophthalic anhydride (0,025 equivalent) was added and held at 75° C. for 2 hours. The calculated equivalent weights were as follows: 5000 methacrylate, 20,000 tetrachlorophthalic acid, 2100 hydroxyl. The final inherent viscosity was 0.33 dl/g.

Example 21

Preparation of Radiation Curable Metal Particle Dispersions and Radiation Cured Tapes All of the weights given in this Example are based on 11.02 lbs (5.00 kg) of metal particle pigment being present in the coating formulation. In practice, however, some dispersion may be lost during the various processing steps. If this happens, the weights of the ingredients given in this example must be adjusted in practice to account for the amount of lost metal particle pigment.

6 g of propyl gallate, 6 g of IRGAFOS 168™ (a process stabilizer from Ciba-Geigy Corporation) 200 g of 50% RHODAFAC BG-510 (a dispersant from Rhone-Poulenc Co.) in MEK, 2.85 kg of 21% solution of Non-Halogenated Resin "A" in MEK, 480 g of 41.4% solution of Example 18 polyurethane in MEK were sequentially added to 1.5 kg of methyl ethyl ketone. The resulting solution was mixed in an enclosed high shear mixer for 10 minutes. The mixing apparatus was then purged with $N_2$ gas.

Next, 5.0 kg of Fe metal particle (TODA™) followed by 0.25 kg of alumina (Ceralox 0.4x) were added sequentially to the dispersion. The dispersion was mixed under an $N_2$ atmosphere in the high shear mixer for an additional 2 hours.

Next, 6.07 kg of methyl ethyl ketone and 1.12 kg of xylene were added to the mixture. The mixture was then mixed with a high shear mixer for two hours. After mixing, the dispersion was thinned down to 35% solids by adding 2.59 kg of methyl ethyl ketone and 0.29 kg xylene. The mixture was then milled pass to pass in a sandmill until smooth using ceramic media.

The magnetic dispersion was then coated onto one side of a polyester substrate bearing a carbon-black containing coating on its other side. Just prior to coating the magnetic dispersion onto the substrate, 500 g of 40% solution of Example 19 polyurethane in MEK was added to the dispersion, followed by addition of a solution of 50 g butyl stearate and 100 g myristic acid in 765 g methyl ethyl ketone. The dispersion was then high shear mixed and then filtered. After coating the magnetic dispersion onto the substrate, the coated substrate was then passed through 2 magnetic fields (1200 and 3000 gauss) to orient the magnetic pigment. The coated substrate was then dried in two subsequent ovens at 60° C. and 82° C., and the magnetic and backside coatings were then calendared. The coated substrate was then irradiated with 8.0 Mrads of electron beam radiation in a $N_2$ atmosphere containing no more than 50 ppm $O_2$.

The resulting magnetic media showed a squareness of 0.770 and a coercivity of 1528 Oe and a remanence of 2620 gauss. All bulk magnetic measurements were made with a vibrating sample magnetometer at 12.3 KOe. The magnetic coating had a 45° gloss value of 157 and a surface smoothness (Rq) of 6.37 nm as measured with a Wyko high resolution interferometer from Wyko Co.

Example 22

The procedure of Example 21 was repeated identically except that 500 g of Example 20 was used in place of 500 g of Example 19.

The resulting magnetic media showed a squareness of 0.743 and a coercivity of 1520 Oe and a remanence of 2475 gauss. All bulk magnetic measurements were made with a vibrating sample magnetometer ("VSM") at 12.3 KOe. The magnetic coating had a 45° gloss value of 156 and a surface smoothness (Rq) of 6.20 nm as measured with a Wyko interferometer.

While this invention has been described in connection with specific embodiments, it should be understood that it is capable of further modification. The claims herein are intended to cover those variations which one skilled in the art would recognize as the chemical equivalent of what has been described herein.

What is claimed:

1. A carboxylic acid and hydroxyl functional polyurethane polymer comprising the reaction product of:
   (a) one or more polyisocyanates;
   (b) one or more polyols;
   (c) one or more compounds selected from the group consisting of cyclic dicarboxylic acid anhydrides derived from carboxylic acids having a pKa of less than 1.5;
   wherein the acid content of the polyurethane is about 0.01 to about 0.3 meq/g;
   wherein the hydroxyl content of the polyurethane is at least about 0.01 meq/g; and
   wherein the molar ratio of hydroxyl groups to the sum of the isocyanate groups plus anhydride groups of reactants from which the polyurethane is formed is greater than 1:1.

2. A carboxylic acid and hydroxyl functional polyurethane polymer comprising the reaction product of:
   (a) one or more polyisocyanates;
   (b) one or more polyols;
   (c) one or more compounds selected from the group consisting of cyclic dicarboxylic acid anhydrides derived from carboxylic acids having a pKa of less than 2.0; and (d) at least one vinyl polymeric macromonomer diol prepared from monomers which do not have reactive sites towards polyisocyanates;
wherein the hydroxyl content of the polyurethane is at least about 0.01 meq/g; and
wherein the molar ratio of hydroxyl groups to the sum of the isocyanate groups plus anhydride groups of reactants from which the polyurethane is formed is greater than 1.1.

3. The polyurethane polymer of claim 1 wherein said cyclic dicarboxylic acid anhydride is selected from the group consisting of 2-chloromaleic acid anhydride; 2,3-dichloromaleic acid anhydride; tetrafluorophthalic acid anhydride; 3,6-dinitrophthalic acid anhydride; tetrafluorosuccinic acid anhydride; tetrabromosuccinic acid anhydride; tetrachlorosuccinic acid anhydride; cyclobut-1-ene-1,2-dicarboxylic acid anhydride; tetraiodophthalic acid anhydride; tetrabromophthalic acid anhydride; tetrachlorophthalic acid anhydride; 2,3-dibromomaleic acid anhydride; bicyclo[2.2.1]hepta-2,5-diene-2,3-dicarboxylic acid anhydride; bicyclo[2.2.1]hepta-2-ene-2,3-dicarboxylic acid anhydride; 3,6-dichlorophthalic acid anhydride; 2,3-dibromosuccinic acid anhydride; furan-3,4-dicarboxylic acid anhydride; 2-bromomaleic acid anhydride; 4,5-dichlorophthalic acid anhydride; and cyclopent-1-ene-1,2-dicarboxylic acid anhydride.

4. The polyurethane polymer of claim 1 wherein said cyclic dicarboxylic acid anhydride is selected from the group consisting of tetrachlorophthalic anhydride; tetrafluorophthalic anhydride; tetrabromophthalic anhydride; and 2,3-dichloromaleic anhydride.

5. The polyurethane polymer of claim 2 wherein said cyclic dicarboxylic acid anhydride is selected from the group consisting of 2-chloromaleic acid anhydride; 2,3-dichloromaleic acid anhydride; tetrafluorophthalic acid anhydride; 3,6-dinitrophthalic acid anhydride; tetrafluorosuccinic acid anhydride; tetrabromosuccinic acid anhydride; tetrachlorosuccinic acid anhydride; cyclobut-1-ene-1,2-dicarboxylic acid anhydride; tetraiodophthalic acid anhydride; tetrabromophthalic acid anhydride; tetrachlorophthalic acid anhydride; 2,3-dibromomaleic acid anhydride; bicyclo[2.2.1]hepta-2,5-diene-2,3-dicarboxylic acid anhydride; bicyclo[2.2.1]hepta-2-ene-2,3-dicarboxylic acid anhydride; 3,6-dichlorophthalic acid anhydride; 2,3-dibromosuccinic acid anhydride; furan-3,4-dicarboxylic acid anhydride; 2-bromomaleic acid anhydride; 4,5-dichlorophthalic acid anhydride; cyclopent-1-ene-1,2-dicarboxylic acid anhydride; maleic acid anhydride; and 3-nitrophthalic acid anhydride.

6. The polyurethane polymer of claim 2 wherein said cyclic dicarboxylic acid anhydride is selected from the group consisting of tetrachlorophthalic anhydride, tetrafluorophthalic anhydride, tetrabromophthalic anhydride, and 2,3-dichloromaleic anhydride.

7. A polyurethane polymer having pendant therefrom at least one pendant group selected from the group consisting of Formula IV:

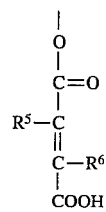

Formula IV wherein
$R^5$ is independently selected from the group consisting of —Cl, —Br, —I, —F, and —H;
$R^6$ is independently selected from the group consisting of —Cl, —Br, —I, —F, and —H;
wherein $R^5$ and $R^6$ cannot simultaneously represent —H; and
wherein $R^5$ and $R^6$ may alternatively form a cyclopentyl group;
and Formula V:

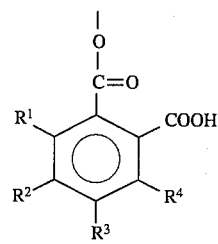

Formula V wherein
$R^1$ is independently selected from the group consisting of —Cl, —Br, —I, —F, and —H;
$R^2$ is independently selected from the group consisting of —Cl, —Br, —I, —F, and —H;
$R^3$ is independently selected from the group consisting of —Cl, —Br, —I, —F, and —H;
$R^4$ is independently selected from the group consisting of —Cl, —Br, —I, —F, and —H; and
wherein at least two of said $R^1$, $R^2$, $R^3$, and $R^4$ are other than —H;
and combinations of Formula IV and Formula V;
wherein the hydroxyl functionality of the polyurethane polymer is at least about 0.01 meq/g;
wherein the polyurethane polymer optionally has one or more pendant vinyl polymeric segments; and
wherein the polyurethane polymer has an acid content of about 0.01 to about 0.3 meq/g.

8. A carboxylic acid-functional polyurethane polymer comprising: a plurality of —COOH groups, a plurality of —OH groups, and optionally one or more vinyl polymeric segments pendant from a polyurethane polymer backbone, wherein the polyurethane polymer has a —COOH content of about 0.01 to 0.3 meq/g, and wherein said carboxylic acid-functional polyurethane polymer is obtained by the condensation reaction(s) of a hydroxyl group(s) pendant from said polyurethane polymer backbone with an anhydride selected from the group consisting of 2-chloromaleic acid anhydride; 2,3-dichloromaleic acid anhydride; tetrafluorphthalic acid anhydride; 3,6-dinitrophthalic acid anhydride; tetrafluorosuccinic acid anhydride; tetrabromosuccinic acid anhydride; tetrachlorosuccinic acid anhydride; cyclobut-1-ene-1,2-dicarboxylic acid anhydride; tetraiodophthalic acid anhydride; tetrabromophthalic acid anhydride; tetrachlorophthalic acid anhydride; 2,3-dibromomaleic acid anhydride; bicyclo[2.2.1]hepta-2,5-diene-2,3- dicarboxylic acid anhydride; bicyclo[2.2.1]hepta-2-ene-2,3-dicarboxylic acid anhydride; 3,6-dichlorophthalic acid anhydride; 2,3-dibromosuccinic acid anhydride; furan-3,4-dicarboxylic acid anhydride; 2-bromomaleic acid anhydride; 4,5-dichlorophthalic acid anhydride; and cyclopent-1-ene-1,2-dicarboxylic acid anhydride; and wherein the hydroxyl functionality of the polyurethane polymer is at least about 0.01 meq/g.

9. The polymer of claim 1 wherein:
   (i) the —COOH group content of the polymer ranges from about 0.02 to about 0.1 meq/g; and
   (ii) the hydroxy content of the polymer ranges from about 0.1 to about 1 meq/g.

10. The polyurethane polymer of claim 1 wherein said polyurethane polymer further comprises one or more pendant radiation-curable moieties.

11. A magnetic recording medium, comprising a magnetic layer provided on a nonmagnetizable substrate, wherein the magnetic layer comprises a magnetic pigment dispersed in a polymeric binder, and wherein the polymeric binder comprises the polymer of claim 1.

12. The magnetic recording medium of claim 11, which further comprises an additive selected from the group consisting of nonmagnetizable pigments, lubricants, dispersants, wetting agents, and curatives.

13. The magnetic recording medium of claim 11 wherein said magnetic pigment is selected from the group consisting of ferric oxides; gamma ferric oxide; cobalt doped gamma ferric oxides, chromium dioxide, iron, iron-cobalt, cobalt, nickel, cobalt-nickel, cobalt phosphorous, barium ferrite, and mixtures thereof.

14. The magnetic recording medium of claim 11 wherein said dispersion further comprises nonmagnetizable pigment selected from the group consisting of carbon black, graphite, aluminum oxide, titanium dioxide, zinc oxide, silica gel, calcium carbonate, barium sulfate, and mixtures thereof.

15. A magnetic recording medium, comprising a magnetic layer provided on a nonmagnetizable substrate, wherein the magnetic layer comprises a magnetic pigment dispersed in a polymeric binder, wherein said binder comprises:
   (a) about 5 to about 95 weight percent of a vinyl chloride copolymer; and
   (b) about 5 to about 95 weight percent of the polymer of claim 1.

16. A magnetic recording medium, comprising a magnetic layer provided on a nonmagnetizable substrate, wherein the magnetic layer comprises a magnetic pigment dispersed in a polymeric binder, wherein said binder comprises:
   (a) about 5 to about 95 weight percent of a vinyl chloride copolymer; and
   (b) about 5 to about 95 weight percent of the polymer of claim 8.

17. The magnetic recording medium of claim 15 wherein said vinyl chloride copolymer has incorporated therein at least one pendant dispersing group selected from the group consisting of —SO$_3$M, —NR$_3$X, —NR$_2$, —OSO$_3$M, —COOM, —OPO$_3$M, and —PO$_3$M, wherein M is a cation selected from the group consisting of alkali metal cations, H$^+$ and ammonium cations, wherein R is selected from the group consisting of alkyl groups comprising about 1 to about 20 carbon atoms, and aralkyl groups comprising about 1 to about 20 carbon atoms, and wherein X is an anion selected from the group consisting of halogens, sulfates, and sulfonates.

18. The magnetic recording medium of claim 15 wherein said vinyl chloride copolymer has incorporated into its structure a monomer selected from the group consisting of vinyl acetate vinyl alcohol, hydroxypropyl acrylate, hydroxypropyl methacrylate, hydroxyethyl acrylate, and hydroxyethyl methacrylate.

19. A magnetic recording medium, comprising a magnetic layer provided on a nonmagnetizable substrate, wherein the magnetic layer comprises a magnetic pigment dispersed in a polymeric binder, wherein said binder comprises:
   (a) about 5 to about 95 weight percent of a vinyl chloride copolymer; and
   (b) about 5 to about 95 weight percent of the polymer of claim 10.

20. The magnetic recording medium of claim 15 which further comprises an additive selected from the group consisting of nonmagnetizable pigments, lubricants, dispersants, wetting agents, and curatives.

21. The magnetic recording medium of claim 15 wherein said magnetic pigment is selected from the group consisting of ferric oxides; gamma ferric oxide; cobalt doped gamma ferric oxides, chromium oxide, iron, iron-cobalt, cobalt, nickel, cobalt-nickel, cobalt phosphorous, barium ferrite, and mixtures thereof.

22. The magnetic recording medium of claim 15 which further comprises nonmagnetizable pigment selected from the group consisting of carbon black, graphite, aluminum oxide, titanium dioxide, zinc oxide, silica gel, calcium carbonate, barium sulfate, and mixtures thereof.

23. A magnetic recording medium having a backcoat comprising:
   (a) about 5 to about 95 weight percent of a vinyl chloride copolymer;
   (b) about 5 to about 95 weight percent of the polymer of claim 1 based upon the total weight of (a) plus (b); and
   (c) non-magnetizable pigment.

24. A magnetic recording medium, comprising a magnetic layer provided on a nonmagnetizable substrate, wherein the magnetic layer comprises a magnetic pigment dispersed in a polymeric binder, wherein said polymeric binder comprises:
   (a) about 5 to about 95 weight percent of a nonhalogenated vinyl copolymer, wherein the vinyl copolymer comprises a plurality of pendant nitrile groups, a plurality of pendant hydroxyl groups, and at least one pendant dispersing group; and
   (b) about 5 to about 95 weight percent of the polymer of claim 1.

25. A magnetic recording medium, comprising a magnetic layer provided on a nonmagnetizable substrate, wherein the magnetic layer comprises a magnetic pigment dispersed in a polymeric binder, wherein said polymeric binder comprises:
   (a) about 5 to about 95 weight percent of a nonhalogentated vinyl copolymer, wherein the vinyl copolymer comprises a plurality of pendant nitrile groups, a plurality of pendant hydroxyl groups, and at least one pendant dispersing group; and
   (b) about 5 to about 95 weight percent of the polymer of claim 2.

26. A magnetic recording medium, comprising a magnetic layer provided on a nonmagnetizable substrate, wherein the magnetic layer comprises a magnetic pigment dispersed in a polymeric binder, wherein said polymeric binder comprises:
   (a) about 5 to about 95 weight percent of a nonhalogenated vinyl copolymer, wherein the vinyl copolymer comprises a plurality of pendant nitrile groups, a plurality of pendant hydroxyl groups, and at least one pendant dispersing group; and (b) about 5 to about 95 weight percent of the polymer of claim 7.

27. A magnetic recording medium, comprising a magnetic layer provided on a nonmagnetizable substrate, wherein the magnetic layer comprises a magnetic pigment dispersed in a polymeric binder, and wherein the polymeric binder comprises:
   (a) a nonhalogenated vinyl copolymer, wherein the vinyl copolymer comprises a plurality of pendant nitrile groups, a plurality of pendant hydroxyl groups, and at least one pendant dispersing group; and
   (b) the polyurethane polymer of claim 3.

28. A magnetic recording medium, comprising a magnetic layer provided on a nonmagnetizable substrate, wherein the magnetic layer comprises a magnetic pigment dispersed in a polymeric binder, and wherein the polymeric binder comprises:
   (a) a nonhalogenated vinyl copolymer, wherein the vinyl copolymer comprises a plurality of pendant nitrile groups, a plurality of pendant hydroxyl groups, and at least one pendant dispersing group; and
   (b) the polyurethane polymer of claim 5.

29. A magnetic recording medium, comprising a magnetic layer provided on a nonmagnetizable substrate, wherein the magnetic layer comprises a magnetic pigment dispersed in a polymeric binder, and wherein the polymeric binder comprises:
   (a) a nonhalogenated vinyl copolymer, wherein the vinyl copolymer comprises a plurality of pendant nitrile groups, a plurality of pendant hydroxyl groups, and at least one pendant dispersing group; and
   (b) the polyurethane polymer of claim 10.

30. The magnetic recording medium of claim 24, wherein the nonhalogenated vinyl copolymer is a copolymer of monomers comprising:
   (a) 5 to 40 parts by weight of (meth)acrylonitrile;
   (b) 30 to 80 parts by weight of a nonhalogenated, non-dispersing, vinyl monomer;
   (c) 5 to 30 parts by weight of a nonhalogenated, hydroxyl functional, vinyl monomer; and
   (d) 0.25 to 10 parts by weight of a nonhalogenated, vinyl monomer bearing a dispersing group.

31. The magnetic recording medium of claim 30, wherein the dispersing group of the nonhalogenated, vinyl monomer bearing a dispersing group is selected from the group consisting of quaternary ammonium moiety, amine moiety, salt or acid moiety based on sulfate, salt or acid based on sulfonate, salt or acid moiety based on phosphate, salt or acid moiety based on phosphonate, and salt or acid moiety based on carboxyl.

32. The magnetic recording medium of claim 30 wherein monomer (b) is styrene and monomer (d) is a vinyl monomer bearing a quaternary ammonium moiety.

33. The magnetic recording medium of claim 24 which further comprises an additive selected from the group consisting of nonmagnetizable pigments, lubricants, dispersants, setting agents, and curatives.

34. The magnetic recording medium of claim 24 wherein said magnetic pigment is selected from the group consisting of ferric oxides; gamma ferric oxide; cobalt doped gamma ferric oxides, chromium oxide, iron, iron-cobalt, cobalt, nickel, cobalt-nickel, cobalt phosphorous, barium ferrite, and mixtures thereof.

35. The magnetic recording medium of claim 24 which further comprises non-magnetizable pigment selected from the group consisting of carbon black, graphite, aluminum oxide, titanium dioxide, zinc oxide, silica gel, calcium carbonate, barium sulfate, and mixtures thereof.

36. A magnetic recording medium having a backcoat comprising:
   (a) about 5 to about 95 weight percent of a nonhalogenated vinyl copolymer, wherein the vinyl copolymer comprises a plurality of pendant nitrile groups, a plurality of pendant hydroxyl groups, and at least one pendant dispersing group; and
   (b) about 5 to about 95 weight percent of the polymer of claim 1.

37. A magnetic recording medium having a backcoat comprising:
   (a) about 5 to about 95 weight percent of a nonhalogenated vinyl copolymer, wherein the vinyl copolymer comprises a plurality of pendant nitrile groups, a plurality of pendant hydroxyl groups, and at least one pendant dispersing group; and
   (b) about 5 to about 95 weight percent of the polymer of claim 2.

38. A magnetic recording medium, comprising a magnetic layer provided on a nonmagnetizable substrate, wherein the magnetic layer comprises a magnetic pigment dispersed in a polymeric binder, and wherein the polymeric binder comprises the polymer of claim 2.

39. The magnetic recording medium of claim 38, which further comprises an additive selected from the group consisting of nonmagnetizable pigments, lubricants, dispersants, setting agents, and curatives.

40. The magnetic recording medium of claim 38, wherein said magnetic pigment is selected from the group consisting of ferric oxides; gamma ferric oxide; cobalt doped gamma ferric oxides, chromium dioxide, iron, iron-cobalt, cobalt, nickel, cobalt-nickel, cobalt phosphorous, barium ferrite, and mixtures thereof.

41. The magnetic recording medium of claim 38 wherein said dispersion further comprises nonmagnetizable pigment selected from the group consisting of carbon black, graphite, aluminum oxide, titanium dioxide, zinc oxide, silica gel, calcium carbonate, barium sulfate, and mixtures thereof.

* * * * *

UNITED STATES PATENT AND TRADEMARK OFFICE
CERTIFICATE OF CORRECTION

PATENT NO.: 5,512,651

DATED: April 30, 1996

INVENTOR(S): James G. Carlson, Jeffrey T. Anderson, and Nelson T. Rotto

It is certified that error appears in the above-identified patent and that said Letters Patent is hereby corrected as shown below:

Column 5, lines 15-20, the formula reading

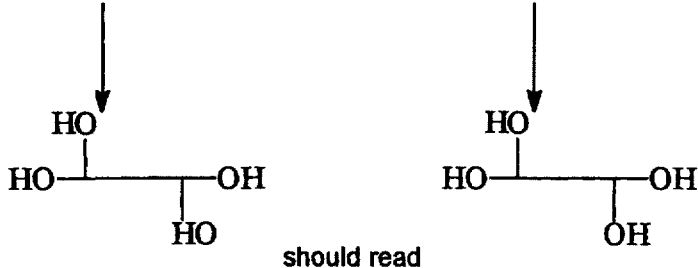

should read

Column 16, line 9, the formula reading -$N^+(CH_3)_2(CH_2CH_2CH_2SO_3^+)$ should read -$N^+(CH_3)_2(CH_2CH_2CH_2SO_3^-)$ Signed and Sealed this Sixteenth Day of December, 1997

Attest:

BRUCE LEHMAN

Attesting Officer

Commissioner of Patents and Trademarks